United States Patent
Takei et al.

(10) Patent No.: US 8,272,486 B2
(45) Date of Patent: Sep. 25, 2012

(54) HYDRAULIC CONTROL DEVICE FOR TORQUE CONVERTER WITH LOCK-UP CLUTCH

(75) Inventors: Hiroshi Takei, Wako (JP); Yutaka Ishikawa, Wako (JP); Yoshimichi Tsubata, Wako (JP); Motoo Takeda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 440 days.

(21) Appl. No.: 12/625,842

(22) Filed: Nov. 25, 2009

(65) Prior Publication Data

US 2010/0126816 A1    May 27, 2010

(30) Foreign Application Priority Data

Nov. 27, 2008   (JP) ................................. 2008-303268

(51) Int. Cl.
*F16H 61/14* (2006.01)
(52) U.S. Cl. ...................... 192/3.3; 192/3.58; 192/13 R
(58) Field of Classification Search .................. None
See application file for complete search history.

(56) References Cited

U.S. PATENT DOCUMENTS

| | | | | |
|---|---|---|---|---|
| 5,435,211 A | * | 7/1995 | Matsumoto et al. | ........... 192/3.3 |
| 2011/0094842 A1 | * | 4/2011 | Tsunekawa | ................... 192/3.3 |

FOREIGN PATENT DOCUMENTS

| | | |
|---|---|---|
| JP | 2-62471 A | 3/1990 |
| JP | 2-212667 A | 8/1990 |
| JP | 2007-211942 A | 8/2007 |

OTHER PUBLICATIONS

Chinese Office Action dated Jun. 1, 2012, issued in corresponding Chinese Patent Application No. 200910226071.2, (13 pages). With English Translation.

* cited by examiner

*Primary Examiner* — Rodney Bonck
(74) *Attorney, Agent, or Firm* — Westerman, Hattori, Daniels & Adrian, LLP

(57) ABSTRACT

A control section determines a driving state of a vehicle and controls first and second solenoid valves on the basis of the determined driving state. An oil passage length of a second oil discharge passage is shorter than that of a first oil discharge passage and a discharge end of the second oil discharge passage is opened at a lower position than that of the first oil discharge passage. The control section derives hydraulic oil, discharged from an oil chamber via a first shift valve, to the first oil discharge passage by means of a second shift valve when it is determined that the driving state is one during normal driving. The control section derives the hydraulic oil to the second oil discharge passage by means of the second shift valve when it is determined that the driving state is one required for rapid lock-up off.

8 Claims, 13 Drawing Sheets

LC OFF DETERMINATION
SPEED RATIO TO THE NUMBER OF REVOLUTIONS OF MAIN SHAFT

AIR CONDITIONER OFF AND ABS NORMAL

| SPEED RATIO | THE NUMBER OF REVOLUTIONS OF MAIN SHAFT (rpm) |
|---|---|
| FIRST | OFF |
| SECOND | 850 |
| THIRD | 850 |
| FOURTH | 850 |
| FIFTH | 850 |
| SIXTH | 850 |

FIG.7A

ABS FAILURE

| SPEED RATIO | THE NUMBER OF REVOLUTIONS OF MAIN SHAFT (rpm) |
|---|---|
| FIRST | OFF |
| SECOND | OFF |
| THIRD | OFF |
| FOURTH | OFF |
| FIFTH | 1200 |
| SIXTH | 1200 |

FIG.7B

HYDRAULIC CONTROL DEVICE FOR TORQUE CONVERTER WITH LOCK-UP CLUTCH

CROSS-REFERENCE TO RELATED APPLICATION

The present disclosure relates to subject matter contained in Japanese Patent Application No. 2008-303268, filed on Nov. 27, 2008, the disclosure of which is expressly incorporated herein by reference in its entirety.

BACKGROUND OF THE INVENTION

1. Field of the Invention

The present invention relates to a hydraulic control device for controlling hydraulic pressure of a torque converter with a lock-up clutch, with which an automatic transmission and the like mounted on a vehicle is provided.

2. Description of the Related Art

For example, as disclosed in Japanese Patent Application Publication No. 2007-211942 (hereinafter, referred to as "Patent Literature 1"), there is known a hydraulic control device for a torque converter (hereinafter, also occasionally abbreviated as a "TC") with a lock-up clutch (hereinafter, also occasionally abbreviated as an "LC"), with which an automatic transmission or the like mounted on a vehicle is provided. The hydraulic control device disclosed in Patent Literature 1 controls supply and discharge of hydraulic oil to and from an oil chamber at a back pressure side of a hydraulic piston of the lock-up clutch. In the hydraulic control device of Patent Literature 1, a drain port for TC inner pressure arranged at an upper position than an outer diameter of the hydraulic piston is placed at a position higher than a drain port for LC back pressure, and this makes it possible to exert a stable canceller effect against centrifugal hydraulic pressure of the oil chamber at the back pressure, which increases at a high revolution of an engine or the like, thereby suppressing drag torque when the LC is caused not to engage. Moreover, by providing an oil reservoir in the drain port for the LC back pressure and supplying hydraulic oil decompressed to a pressure value to the value of atmosphere pressure by means of an orifice thereto, an oil passage from the oil chamber at the back pressure side to the drain port for LC back pressure is filled with the hydraulic oil, whereby preparation to operate the hydraulic piston of the LC is always made. Thus, it is possible to improve a hydraulic pressure response when the LC is operated, and this makes it possible to stabilize an LC function.

In this way, the prior art disclosed in Patent Literature 1 is characterized in that: a discharge end of the drain port for LC back pressure is placed above the upper end of the outer diameter of the hydraulic piston; the oil reservoir is provided at the discharge end of the drain port for LC back pressure; and hydraulic oil is always supplied thereto. However, in this prior art, an oil passage from the oil chamber at the back pressure to the discharge end of the hydraulic oil is long, and the oil passage is always filled with the hydraulic oil. For this reason, there has been a possibility that the hydraulic oil of the oil chamber at the back pressure side cannot be discharged rapidly when the lock-up clutch is switched from an engagement state to a non-engagement state. Thus, for example, there has been a possibility that engagement cannot be released immediately in the case where there is need to set the lock-up clutch to the non-engagement state quickly, such as at sudden braking of the vehicle (at so-called panic stop). In that case, although the vehicle is in substantially a stopped state, a driving shaft of the engine and a rotary shaft of the transmission become an engagement state, whereby it is impossible to cancel power transmitted from the engine. Therefore, there is a possibility that engine stall occurs. In particular, when D-N-R quick shift is carried out in a shift operation of the automatic transmission, a temporary stopped state occurs when to shift from forward to reverse. Despite this, since it is difficult to cause the lock-up clutch to set to a non-engagement state completely, the engagement state between the engine and the transmission continues. For that reason, it is impossible to cancel power transmitted from the engine, whereby there is a possibility that engine stall occurs.

SUMMARY OF THE INVENTION

The present invention is made in view of the above points, and it is an object of the present invention to provide a hydraulic control device for a torque converter with a lock-up clutch, which can ensure a hydraulic pressure response at the time when the lock-up clutch is caused to engage, and set the lock-up clutch to a non-engagement state rapidly in the case where the lock-up clutch is required to set to the non-engagement state quickly such as at sudden braking of a vehicle.

In order to solve the problem described above, the present invention is directed to a hydraulic control device for controlling hydraulic pressure of a torque converter with a lock-up clutch. In the hydraulic control device (1) of the present invention, the lock-up clutch (L) is constructed from a hydraulic piston (25) and a clutch member (21 to 28), the hydraulic piston (25) is installed in an inner space of the torque converter (T) so that an oil chamber (30) is formed between the hydraulic piston (25) and a cover (10) of the torque converter (T), and the clutch member (21 to 28) causes the cover (10) and a turbine runner (4) of the torque converter (T) to engage and be released due to movement of the hydraulic piston (25) by supply and discharge of hydraulic oil to and from the oil chamber (30).

The hydraulic control device (1) includes a first shift valve (31) for carrying out engagement control of the lock-up clutch (L) by switching supply and discharge of the hydraulic oil to and from the oil chamber (30).

The hydraulic control device (1) also includes a first oil discharge passage (37) and a second oil discharge passage (39) for deriving the hydraulic oil discharged from the oil chamber (30) via the first shift valve (31).

The hydraulic control device (1) also includes a second shift valve (33) for switching the first oil discharge passage (37) and the second oil discharge passage (39).

The hydraulic control device (1) also includes first and second solenoid valves (32, 34) for respectively supplying controlled hydraulic pressure for controlling switching of the first and second shift valves (31, 33) to the first and second shift valves (31, 33).

The hydraulic control device (1) also includes a control section (35) for determining a driving state of a vehicle and controlling the first and second solenoid valves (32, 34) on the basis of the determined driving state.

In this case, an oil passage length of the second oil discharge passage (39) is shorter than that of the first oil discharge passage (37) and a discharge end (39a) of the second oil discharge passage (39) is opened at a lower position than that of the first oil discharge passage (37); the control section (35) derives the hydraulic oil, discharged from the oil chamber (30) via the first shift valve (31), to the first oil discharge passage (37) by means of the second shift valve (33) when it is determined that the driving state of the vehicle is one during normal driving; and the control section (35) derives the hydraulic oil to the second oil discharge passage (39) by means of the second shift valve (33) when it is determined that the driving state of the vehicle is one required for rapid lock-up off.

In this regard, reference numerals in parenthesis here are shown as one example of the present invention to indicate reference numerals of corresponding components of embodiments (will be described later).

In the case where it is determined that rapid lock-up off is required, such as at sudden braking in which deceleration of the vehicle becomes a predetermined value or more, or at a D-N-R switching operation of a transmission mounted on the vehicle, it is necessary to set the lock-up clutch to the non-engagement state quickly by discharging the hydraulic oil of the oil chamber at a lock-up clutch back pressure side rapidly. Thus, in the hydraulic control device for the torque converter with the lock-up clutch according to the present invention, the second oil discharge passage whose oil passage length is shorter than that of the first oil discharge passage and in which an opening of the discharge end is positioned at the lower position than that in the first oil discharge passage is provided as a derivation route of the hydraulic oil from the oil chamber in addition to the first oil discharge passage. Therefore, in the case where it is determined that a driving state of the vehicle is one required for rapid lock-up off, the hydraulic oil discharged from the oil chamber at the back pressure side of the lock-up clutch can be derived to the second oil discharge passage. For this reason, it is possible to shorten a discharge route of the hydraulic oil, and the lock-up clutch can be set to the non-engagement state rapidly. Therefore, it is possible to avoid occurrence of defects such as engine stall effectively at sudden braking of the vehicle or at the D-N-R switching operation.

Further, by providing the second shift valve for switching the first oil discharge passage and the second oil discharge passage, it is possible to switch the discharge route of the hydraulic oil from the oil chamber in accordance with whether the driving state of the vehicle is one at normal driving or one required for rapid lock-up off. Therefore, at normal driving, it is possible to ensure a hydraulic pressure response when to cause the lock-up clutch to engage. In addition, at the time when rapid lock-up off is required, it is possible to set the lock-up clutch to the non-engagement state rapidly. This makes it possible to improve both the hydraulic pressure response of the lock-up clutch and engagement release.

Further, in this hydraulic control device for the torque converter with the lock-up clutch, it is preferable that a drain port (37d) is further provided at the discharge end of the first oil discharge passage (37), the drain port (37d) is placed at a position (H2) higher than an upper end (H1) of an outer diameter of the hydraulic piston (25), and the discharge end (39a) of the second oil discharge passage (39) is placed at a position (H4) lower than a central axis (C) of the torque converter (T). According to this feature, when the first oil discharge passage is selected, the drain port placed at the position higher than the upper end of the outer diameter of the hydraulic piston causes the oil chamber of the lock-up clutch to become a filled state with the hydraulic oil. Therefore, when the lock-up clutch is to be caused to engage at normal driving, hydraulic pressure is immediately transmitted to the hydraulic piston. This makes it possible to improve response speed at engagement of the lock-up clutch. On the other hand, the second oil discharge passage whose discharge end is placed at the position lower than the central axis of the torque converter allows engagement of the lock-up clutch to be released rapidly when rapid lock-up off is required at which the second oil discharge passage is selected.

Further, in this hydraulic control device for the torque converter with the lock-up clutch, it is preferable that the controlled hydraulic pressure supplied to the first shift valve (31) from the first solenoid valve (32) is also supplied to the second shift valve (33) to be used to control switching of ON/OFF of the second shift valve (33). In this case, it is further preferable that a transmission is mounted on the vehicle, and that the controlled hydraulic pressure supplied from the first solenoid valve (32) is further supplied to a third shift valve (52) for switching hydraulic pressure to cause a reverse clutch (51) provided in the transmission to engage, and is used as the controlled hydraulic pressure of the third shift valve (52). According to this feature, when the D-N-R operation is carried out in speed ratio operations by means of a select lever, it is possible to select the second oil discharge passage as the discharge route of the hydraulic oil from the oil chamber. Therefore, since engagement of the lock-up clutch can be released before the vehicle becomes a temporary stopped state when to shift from forward to reverse, it is possible to prevent defects such as engine stall from occurring effectively.

Further, in the above-mentioned case, it is preferable that the hydraulic pressure for causing the reverse clutch (51) to engage is supplied to the second shift valve (33) as controlled hydraulic pressure that resists the controlled hydraulic pressure of the first solenoid valve (32). According to this feature, at a so-called reverse stationary state in which predetermined time elapses since a reverse speed ratio is set up in the transmission, the first oil discharge passage can be selected as the discharge route of the hydraulic oil from the oil chamber. Therefore, improvement of a hydraulic pressure response of the lock-up clutch at an R-N-D operation can be expected.

Further, it is preferable that the controlled hydraulic pressure supplied from the second solenoid valve (34) to the second shift valve (33) is supplied to a lubrication cut valve (57) for cutting off supply of hydraulic oil for lubrication, and is used as controlled hydraulic pressure of the lubrication cut valve (57). Namely, by sharing the controlled hydraulic pressure for the second shift valve with the lubrication cut valve, at the time when rapid lock-up off is required, such as at sudden braking of the vehicle, the second oil discharge passage can be selected, and supply of the hydraulic oil for lubrication can be cut off. Thus, not only it is possible to cause the lock-up clutch not to engage immediately, but also it is possible to eliminate an influence of drag of the lock-up clutch effectively.

According to the hydraulic control device for the torque converter with the lock-up clutch of the present invention, it is possible to ensure a hydraulic pressure response at the time when a lock-up clutch is caused to engage, and it is also possible to release engagement of the lock-up clutch in the case where the lock-up clutch is required to set to a non-engagement state quickly such as at sudden braking of a vehicle.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings:

FIG. 7 is tables showing a correspondence of a speed ratio set up during driving of the vehicle to the number of revolutions of the main shaft used to turn the lock-up clutch OFF;

DETAILED DESCRIPTION OF THE INVENTION

Hereinafter, embodiments of the present invention will be described in detail with reference to the appending drawings.

First Embodiment

Figure 1:
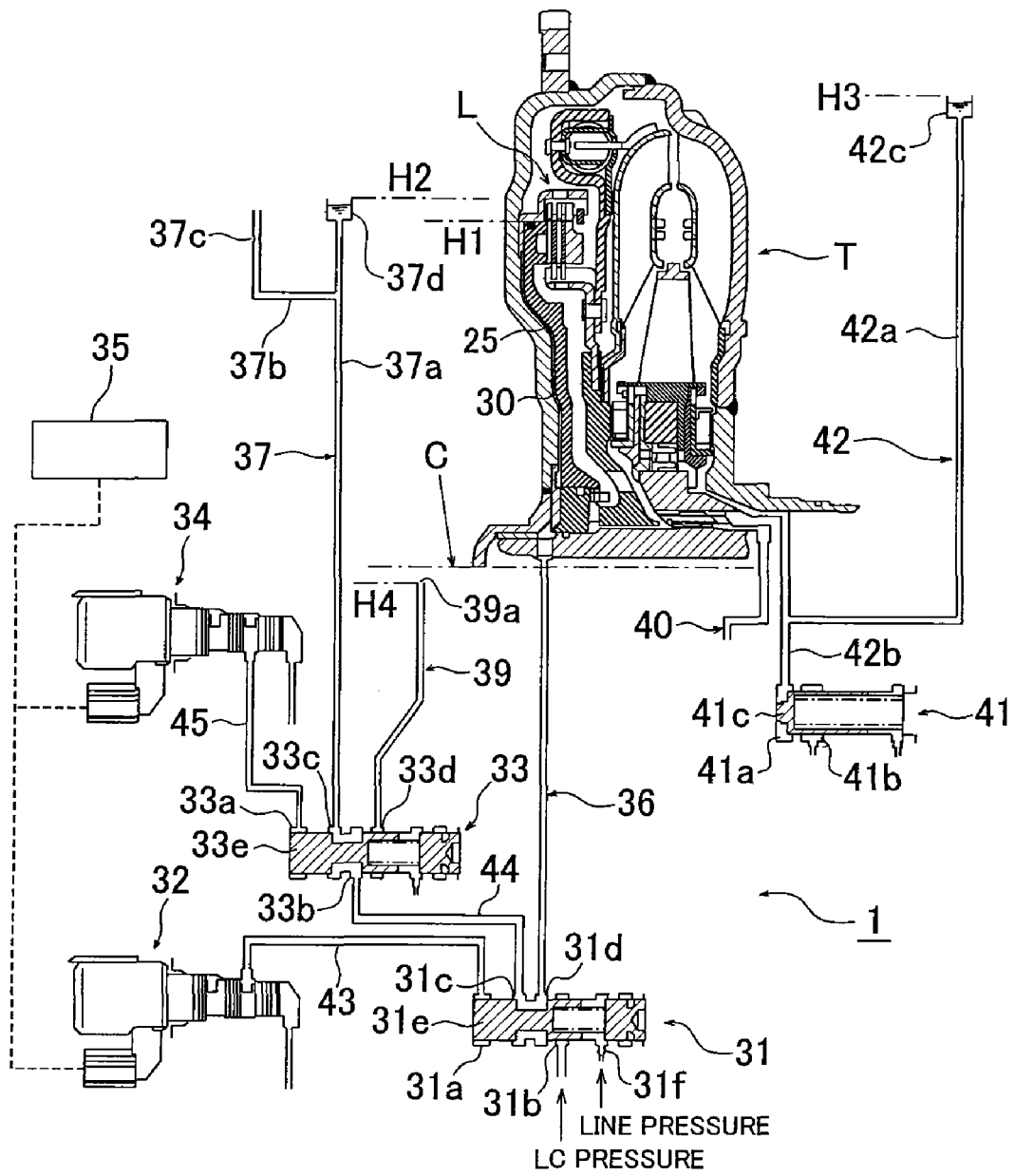
FIG. 1 is a schematic hydraulic circuit diagram showing a hydraulic control device for a torque converter with a lock-up clutch according to a first embodiment of the present invention.
Figure 2:
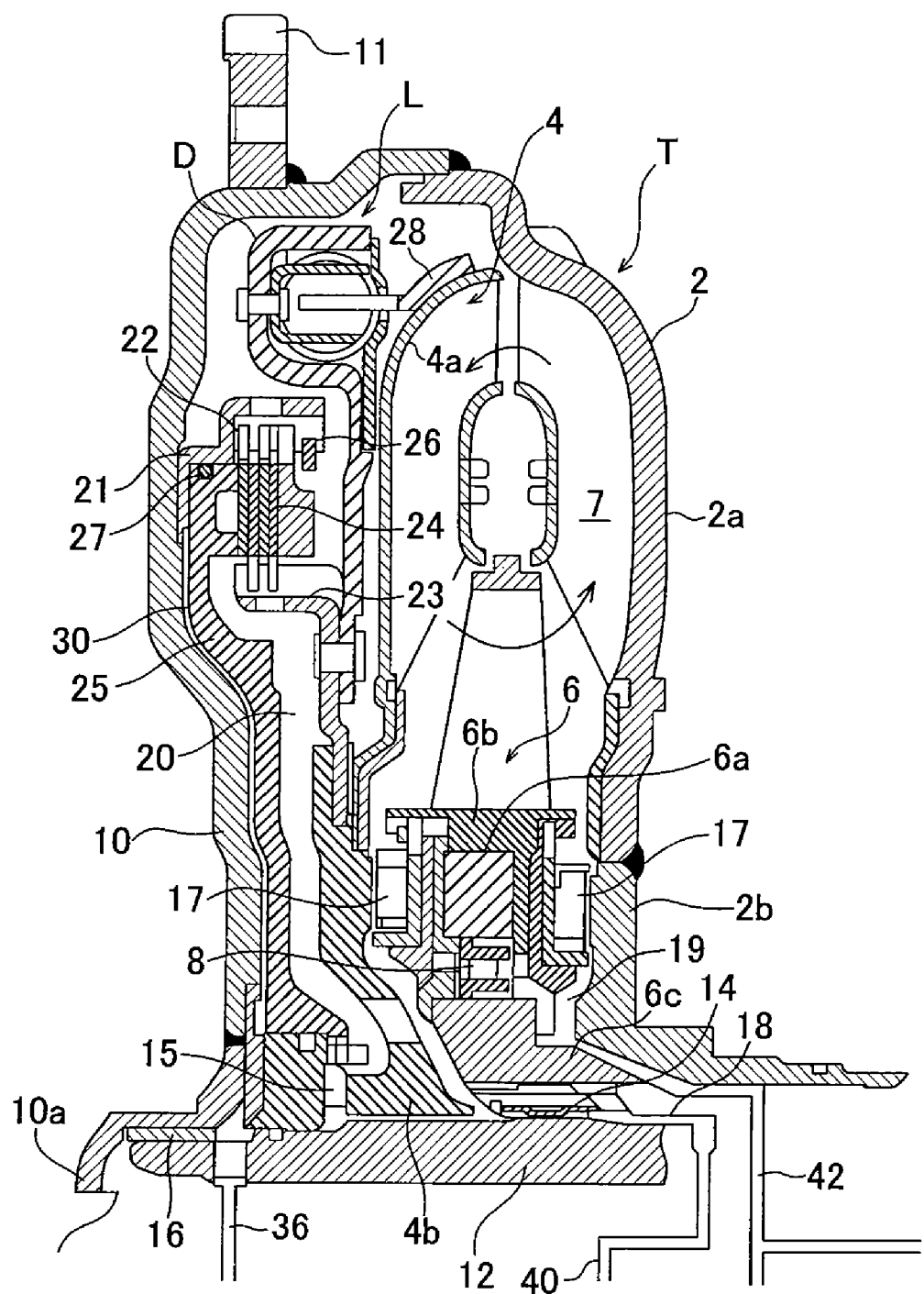
FIG. 2 is a sectional side view showing an internal configuration of the torque converter.

FIG. 1 is a schematic hydraulic circuit diagram showing a hydraulic control device for a torque converter with a lock-up clutch according to a first embodiment of the present invention. Further, FIG. 2 is a sectional side view showing an internal configuration of the torque converter with the lock-up clutch. A torque converter T shown in FIGS. 1 and 2 includes: a pump impeller 2; a turbine runner 4 placed so as to be opposed to the pump impeller 2; and a stator 6 placed between internal portions of the pump impeller 2 and the turbine runner 4. A circulation circuit 7 for power transmission by hydraulic oil is formed in a space between three members of the pump impeller 2, the turbine runner 4 and the stator 6.

A side cover 10 for covering a lateral surface of the turbine runner 4 is integrally provided by welding on an outer circumference of a shell 2a of the pump impeller 2. Connecting bosses 11 arranged in a circumferential direction of the side cover 10 are welded on an outer circumferential surface of the side cover 10. A drive plate (not shown in the drawings) combined with a crank shaft of an engine (not shown in the drawings) is fixed on these connecting bosses 11 with bolts. A thrust needle bearing 15 is inserted between a hub 4a of the turbine runner 4 and the side cover 10.

An output shaft 12 coaxially arranged on the crank shaft is placed at a central part of the torque converter T. This output shaft 12 is spline-connected to a hub 4b of the turbine runner 4, and is rotatably supported to a support tube 10a provided at a central part of the side cover 10 via a bearing bush 16. The output shaft 12 becomes a chief axis of a multi-speed transmission (not shown in the drawings).

A stator shaft 6c for supporting a hub 6a of the stator 6 via a freewheel 8 is arranged on an outer circumference of the output shaft 12. A needle bearing 14 that allows relative rotation of the output shaft 12 and the stator shaft 6c is provided therebetween. Each of thrust needle bearings 17, 17 is provided between each of both end surfaces of the hub 6b of the stator 6 in an axis direction and an end face of each of the hubs 4a, 4b of the pump impeller 2 and the turbine runner 4 that face the both end surfaces of the hub 6b. The thrust needle bearings 17, 17 and the thrust needle bearing 15 control movement of the turbine runner 4 and the stator 6 between the pump impeller 2 and the side cover 10 in the axis direction.

A clutch chamber 20 in communication with the circulation circuit 7 at the outer circumference side is formed between the turbine runner 4 and the side cover 10. A lock-up clutch L that allows direct drive between the turbine runner 4 and the side cover 10 is provided in the clutch chamber 20. A guide member 21, a plurality of disk plates 22, a hub 23, a plurality of disks 24, a hydraulic piston 25, a clip 26, an O-ring 27, a transmitting plate 28 and the like, which constitute a clutch member, are provided in the lock-up clutch L.

The guide member 21 is fixed to an inner circumferential surface of the side cover 10, and is allowed to rotate together with the side cover 10. Each of the disk plates 22 is splined to the guide member 21, thereby being allowed to slide in a direction to a clutch shaft parallel to the output shaft 12 and to rotate around the crank shaft of the engine together with the guide member 21.

The hub 23 is fixed to a torque damper D, and is supported to the hub 4b of the turbine runner 4. Each of the disks 24 is configured so as to attach fading members to both side surfaces of a metallic discoid member, and is arranged between adjacent two disk plates 22. Namely, the disk plates 22 and the disks 24 are alternately arranged in the axis direction.

Each of the disks 24 is splined to the hub 23 at an inner circumferential portion, thereby being allowed to slide in a direction of the clutch shaft and to rotate around the output shaft 12 together with the hub 23. A clip 26 is provided at a right side of the disk plates 22 and the disks 24, whereby movement thereof to the right in the axis direction is restrained. The hub 23 is connected to the transmitting plate 28 fixed to an outer side surface of the turbine runner 4 via the torque damper D.

The hydraulic piston 25 is provided between an inner side surface of a portion at which a part of the inner circumferential surface of the side cover 10 and the guide member 21 are supported by the side cover 10 and the leftmost disk plate 22. An oil chamber (cylinder) 30 is formed in a space between the part of the inner circumferential surface of the side cover 10 and the hydraulic piston 25 at the side cover 10 side (back side thereof). Hydraulic pressure supplied to the oil chamber 30 causes the hydraulic piston 25 to move to the right, thereby pressing the disk plates 22. In this regard, the O-ring 27 for preventing leak of oil is provided at an outer circumferential portion of the hydraulic piston 25 that abuts on the guide member 21.

The hydraulic control device 1 shown in FIG. 1 is a device for controlling hydraulic pressure of each of the lock-up clutch L and the torque converter T. The hydraulic control device 1 is configured so as to include: a lock-up clutch shift valve (hereinafter, referred to as a "first shift valve") 31; a first solenoid valve (shift solenoid) 32 for supplying controlled hydraulic pressure (signal pressure) to the first shift valve 31; a lock-up clutch discharge valve (hereinafter, referred to as a "second shift valve") 33; a second solenoid valve (shift solenoid) 34 for supplying signal pressure to the second shift valve 33; an electronic control unit (hereinafter, referred to as an "ECU") 35 for controlling each of the first and second solenoid valves 32, 34; an oil supply/discharge passage 36; a first oil discharge passage 37; a second oil discharge passage 39; an oil supply passage 40; a pressure adjusting valve 41; and a third oil discharge passage 42.

The first shift valve 31 is configured so as to include: a first port 31a; a second port 31b; a third port 31c; a fourth port 31d; a fifth port 31f; and a spool 31e. The first solenoid valve 32 is connected to the first port 31a via an oil passage 43. Lock-up clutch pressure regulated by a regulator valve (not shown in the drawings) is supplied to the second port 31b. The third port 31c is connected to the second shift valve 33 via an oil passage 44. The fourth port 31d is connected to the oil chamber 30 of the torque converter T via the oil supply/discharge passage 36. Line pressure regulated by the regulator valve (not shown in the drawings) is supplied to the fifth port 31f. In this regard, the line pressure to the fifth port 31f is supplied only when a shift position selected by means of operations of a select lever (not shown in the drawings) is any one of P (Parking), R (Reverse) and N (Neutral).

The spool 31e of the first shift valve 31 is biased to the left by a spring. Therefore, when the first solenoid valve 32 is turned ON, signal pressure supplied from the first solenoid valve 32 causes the spool 31e to move to the right against biasing force of the spring. Thus, the second port 31b is in communication with the fourth port 31d, and communication between the third port 31c and the fourth port 31d is cut off. Therefore, the lock-up clutch pressure supplied to the second port 31b is supplied to the oil chamber 30 via the fourth port 31d, and is used to cause the lock-up clutch L to engage. On the other hand, when the first solenoid valve 32 is turned OFF, biasing force of the spring causes the spool 31e to move to the left. Thus, the third port 31c is in communication with the fourth port 31d, and the second port 31b is cut off. Therefore, hydraulic oil discharged from the oil chamber 30 is introduced from the fourth port 31d into the third port 31c.

The second shift valve 33 is configured so as to include: a first port 33a; a second port 33b; a third port 33c; a fourth port 33d; and a spool 33e. The second solenoid valve 34 is connected to the first port 33a via an oil passage 45. The second port 33b is connected to the third port 31c of the first shift valve 31 via the oil passage 44. The first oil discharge passage 37 is connected to the third port 33c. The second oil discharge passage 39 is connected to the fourth port 33d.

The first oil discharge passage 37 is a discharge route of the hydraulic oil, which is selected at normal driving (will be described later). The first oil discharge passage 37 is configured so as to include: a main oil passage 37a; a branch oil passage 37b; an orifice 37c; and a drain port 37d having an oil reservoir. The main oil passage 37a extends upward from the third port 33c to lead to the drain port 37d, and the branch oil passage 37b is branched in the middle of the main oil passage 37a. Hydraulic oil regulated by the regulator valve (not shown in the drawings) is supplied to the branch oil passage 37b, and the hydraulic oil is decompressed by the orifice 37c provided in the middle of the branch oil passage 37b to be supplied to the main oil passage 37a. The hydraulic oil supplied from the branch oil passage 37b is collected in the oil reservoir of the drain port 37d. The drain port 37d is opened to the atmosphere, and is placed at a height H2 higher than a height H1 of an upper end of the outer diameter of the hydraulic piston 25 so that the space of the oil chamber 30 to the upper end of the outer diameter of the hydraulic piston 25 is filled with the hydraulic oil.

The second oil discharge passage 39 is a discharge route of the hydraulic oil, which is selected at the time of need for rapid lock-up off (will be described later). An opening 39a of a discharge end is placed at a position H4 lower than the central axis C of the torque converter T. Namely, the second oil discharge passage 39 is adapted to discharge hydraulic oil to a position lower than the central axis C and in the air. Further, the whole length of an oil passage in the second oil discharge passage 39 is shorter than that in the first oil discharge passage 37.

The spool 33e of the second shift valve 33 is biased to the left by means of a spring. Therefore, when the second solenoid valve 34 is turned ON, signal pressure supplied thereto causes the spool 33e to move to the right against biasing force of the spring. Thus, the second port 33b is in communication with the fourth port 33d, and communication between the second port 33b and the third port 33c is cut off. On the other hand, when the second solenoid valve 34 is turned OFF, the biasing force of the spring causes the spool 33e to move to the left. Thus, the second port 33b is in communication with the third port 33c, and communication between the second port 33b and the fourth port 33d is cut off.

The oil supply passage 40 is connected to the circulation circuit 7 of the torque converter T, and hydraulic oil with predetermined pressure that is always supplied is supplied to the torque converter T. The third oil discharge passage 42 is an oil passage for discharging the hydraulic oil from the circulation circuit 7 of the torque converter T. The third oil discharge passage 42 includes: a main oil passage 42a; a branch oil passage 42b; a drain port 42c having an oil reservoir; and the pressure adjusting valve 41. The main oil passage 42a connected to the drain port 42c from the circulation circuit 7 branches the branch oil passage 42b connected to the pressure adjusting valve 41 in the middle of the main oil passage 42a. The main oil passage 42a extends upward from the torque converter T, and is connected to the drain port 42c. The drain port 42c is opened to the atmosphere, and hydraulic oil discharged from the torque converter T is collected in the oil reservoir thereof. The drain port 42c is placed at a position H3 higher than the outer diameter H1 of the hydraulic piston 25 and higher than the position H2 of the drain port 37d of the first oil discharge passage 37.

As shown in FIG. 2, hydraulic oil with predetermined pressure supplied from the oil supply passage 40 flows in the clutch chamber 20 through the oil passage 18 and the needle bearing 14, and the clutch chamber 20 is filled with the hydraulic oil from the center toward the outer circumference. This hydraulic oil flows in the circulation circuit 7, and is discharged to the third oil discharge passage 42 through the thrust needle bearing 17 and the oil passage 19 after the circulation circuit 7 is filled.

Referring again to FIG. 1, the pressure adjusting valve 41 is a valve for adjusting inner pressure of the torque converter T at given pressure. The pressure adjusting valve 41 is configured so as to include: a first port 41a; a second port 41b; and a spool 41c. The first port 41a is connected to the branch oil passage 42b. When hydraulic pressure of the third oil discharge passage 42 becomes predetermined pressure or more, the spool 41c is caused to move to the right. When the spool 41c is caused to move to the right, the second port 41b is connected to the first port 41a, whereby hydraulic oil of the first port 41a is discharged to an oil reservoir (not shown in the drawings). Thus, the inner pressure of the torque converter T is kept the given pressure.

In this regard, in the case where the first oil discharge passage 37 is selected as a discharge route of the hydraulic oil from the oil chamber 30, the oil chamber 30 is filled with the hydraulic oil from the drain port 42c even when the lock-up clutch L is caused not to engage. Therefore, rotation of the side cover 10 causes the hydraulic oil in the oil chamber 30 to rotate, whereby centrifugal hydraulic pressure is generated. The hydraulic piston 25 is pressed to the side at which the lock-up clutch L is caused to engage by means of this centrifugal hydraulic pressure. Thus, it is necessary to cancel this centrifugal hydraulic pressure. Therefore, in the present embodiment, a difference in height between the oil reservoirs of the drain ports 37d, 42c is provided. Each of the drain ports 37d, 42c is opened to the atmosphere, and hydraulic pressure due to hydraulic oil's own weight based on the difference in height of an oil level and the centrifugal hydraulic pressure of the hydraulic oil in the clutch chamber 20 cancels the centrifugal hydraulic pressure from the hydraulic piston 25.

Figure 3:
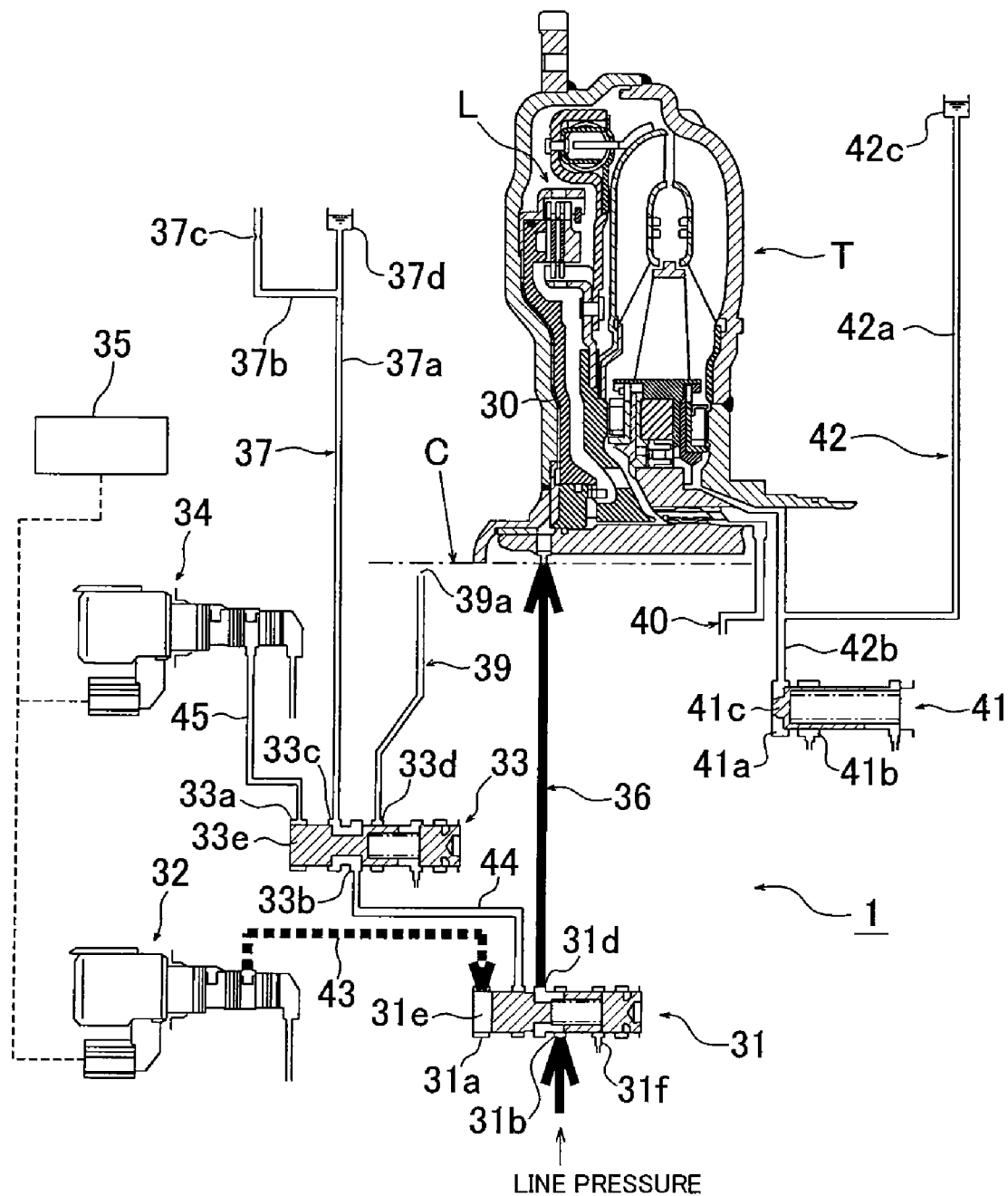
FIG. 3 is a drawing for explaining flow of hydraulic oil when the lock-up clutch is caused to engage.

Here, engagement control of the lock-up clutch L by the hydraulic control device 1 according to the present embodiment will be described. The case where the lock-up clutch L is caused to engage will first be described. FIG. 3 is a drawing showing flow of the hydraulic oil in that case. In order to cause the lock-up clutch L to engage, the first solenoid valve 32 is turned ON by means of control of the ECU 35. Thus, the spool 31e of the first shift valve 31 is caused to move to the right, whereby the second port 31b is connected to the fourth port 31d. This causes line pressure supplied to the second port 31b to be supplied to the oil chamber 30 via the fourth port 31d and the oil supply/discharge passage 36. As a result, hydraulic pressure with predetermined pressure is generated in the oil chamber 30, and the disk plates 22 are pressed to the right via the hydraulic piston 25 by this hydraulic pressure. Thus, the disk plates 22 and the disks 24 slide to the right, whereby the disk plates 22 engage with the disks 24 by frictional force. As a result, engagement between the guide member 21 and the hub 23 causes the lock-up clutch L to engage.

Figure 4A:
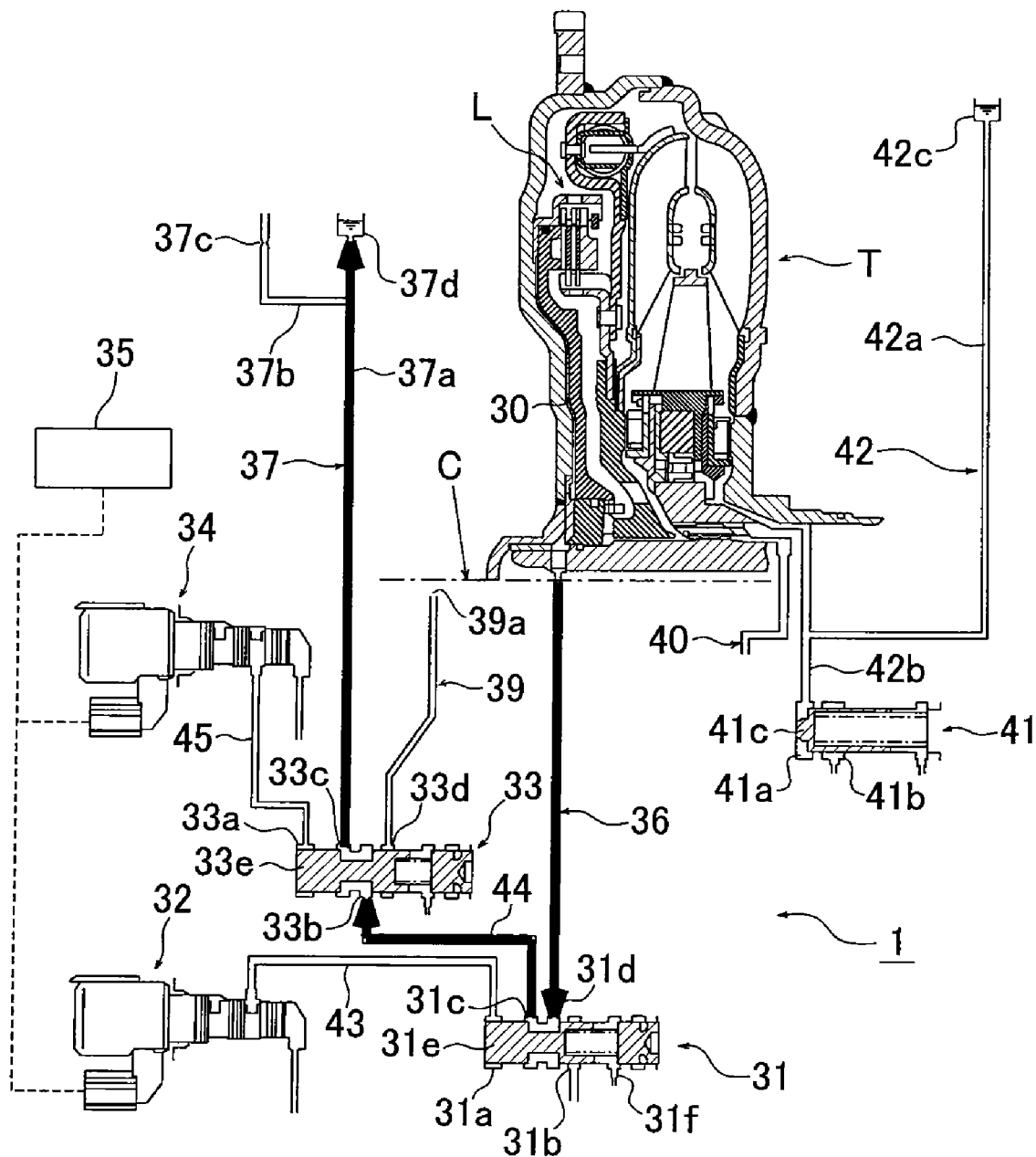
FIG. 4A is a drawing showing flow of hydraulic oil in the case where the lock-up clutch is caused not to engage at normal driving.
Figure 4B:
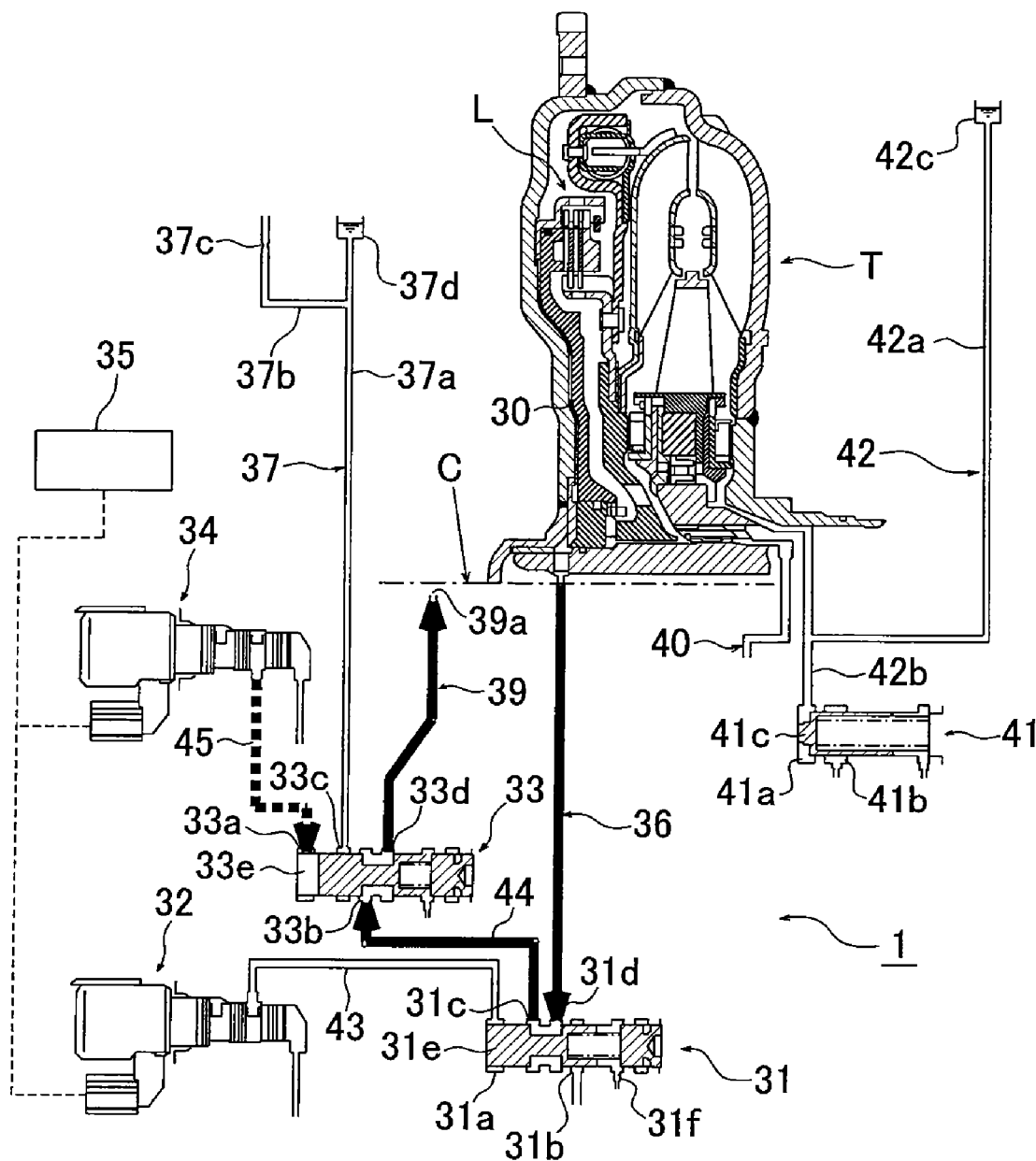
FIG. 4B is a drawing showing flow of hydraulic oil in the case where the lock-up clutch is caused not to engage when rapid lock-up off is required.

Next, the case where the lock-up clutch L is caused not to engage will be described. FIGS. 4A and 4B are drawings each showing flow of the hydraulic oil in that case. FIG. 4A shows flow at normal driving (will be described later), and FIG. 4B shows flow at rapid lock-up off operation. In order to cause the lock-up clutch L not to engage, the first solenoid valve 32 is turned OFF by the ECU 35. Thus, the spool 31e of the first shift valve 31 is caused to move to the left, whereby the third port 31c is connected to the fourth port 31d, and the hydraulic oil is discharged from the oil chamber 30 of the lock-up clutch L via the oil supply/discharge passage 36. The hydraulic oil discharged from the oil chamber 30 is introduced into the second port 33b of the second shift valve 33 through the fourth port 31d and the third port 31c of the first shift valve 31.

In the hydraulic control device 1 according to the present embodiment, the ECU 35 determines a driving state of a vehicle, whereby the ECU 35 can switch discharge routes of the hydraulic oil introduced into the second shift valve 33 on the basis of the determined driving state. Namely, the ECU 35 determines whether a current driving state is one at normal driving or one required for rapid lock-up off in accordance with determination procedures of a driving situation (will be described later).

As a result, in the case where it is determined that it is at normal driving, as shown in FIG. 4A, the second solenoid valve 34 is turned OFF. Thus, in the second shift valve 33, the second port 33b is in communication with the third port 33c, and communication between the second port 33b and the fourth port 33d is cut off. Therefore, the hydraulic oil discharged from the oil chamber 30 of the lock-up clutch L and introduced into the second port 33b is derived to the first oil discharge passage 37.

Here, the hydraulic oil with predetermined pressure from the branch oil passage 37b is always supplied to the main oil passage 37a of the first oil discharge passage 37. This hydraulic oil flows in the oil chamber 30 through the second shift valve 33 and the first shift valve 31, and the oil chamber 30 is filled with the hydraulic oil to the upper end H1 of the outer diameter of the hydraulic piston 25. Further, the hydraulic oil with which the inside of the first oil discharge passage 37 is filled is reserved in the drain port 37d, whereby an oil level of the oil reservoir of the drain port 37d is higher than the upper end H1 of the outer diameter of the hydraulic piston 25.

In this way, since the first oil discharge passage 37 is selected as a discharge route of the hydraulic oil from the oil chamber 30 at normal driving, it is possible to maintain a state where the oil chamber 30 is filled with the hydraulic oil to the outer diameter of the oil chamber 30 even when the lock-up clutch L is caused not to engage. Therefore, when the lock-up clutch L is caused to engage next time, the time to fill the oil chamber 30 with hydraulic oil is not required. For this reason, it is possible to shorten time (response time) required to cause the lock-up clutch L to engage, and this makes it possible to improve a response of the lock-up clutch L.

On the other hand, in the case where it is determined that rapid lock-up off is required, as shown in FIG. 4B, the second solenoid valve 34 is turned ON. Thus, in the second shift valve 33, the second port 33b is in communication with the fourth port 33d, and communication between the second port 33b and the third port 33c is cut off. Therefore, the hydraulic oil discharged from the oil chamber 30 and introduced into the second port 33b is derived to the second oil discharge passage 39.

In this way, at the time when rapid lock-up off is required, the second oil discharge passage 39 is selected as the discharge route of the hydraulic oil from the oil chamber 30. The opening 39a of the discharge end in this second oil discharge passage 39 is placed at a position lower than that in the first oil discharge passage 37, and the oil passage length of the oil discharge passage 39 is shorter than that of the first oil discharge passage 37. For this reason, the hydraulic oil in the oil chamber 30 is allowed to be discharged rapidly, and this makes it possible to decrease the hydraulic pressure. Therefore, the lock-up clutch L can be set to a non-engagement state rapidly.

Figure 5:
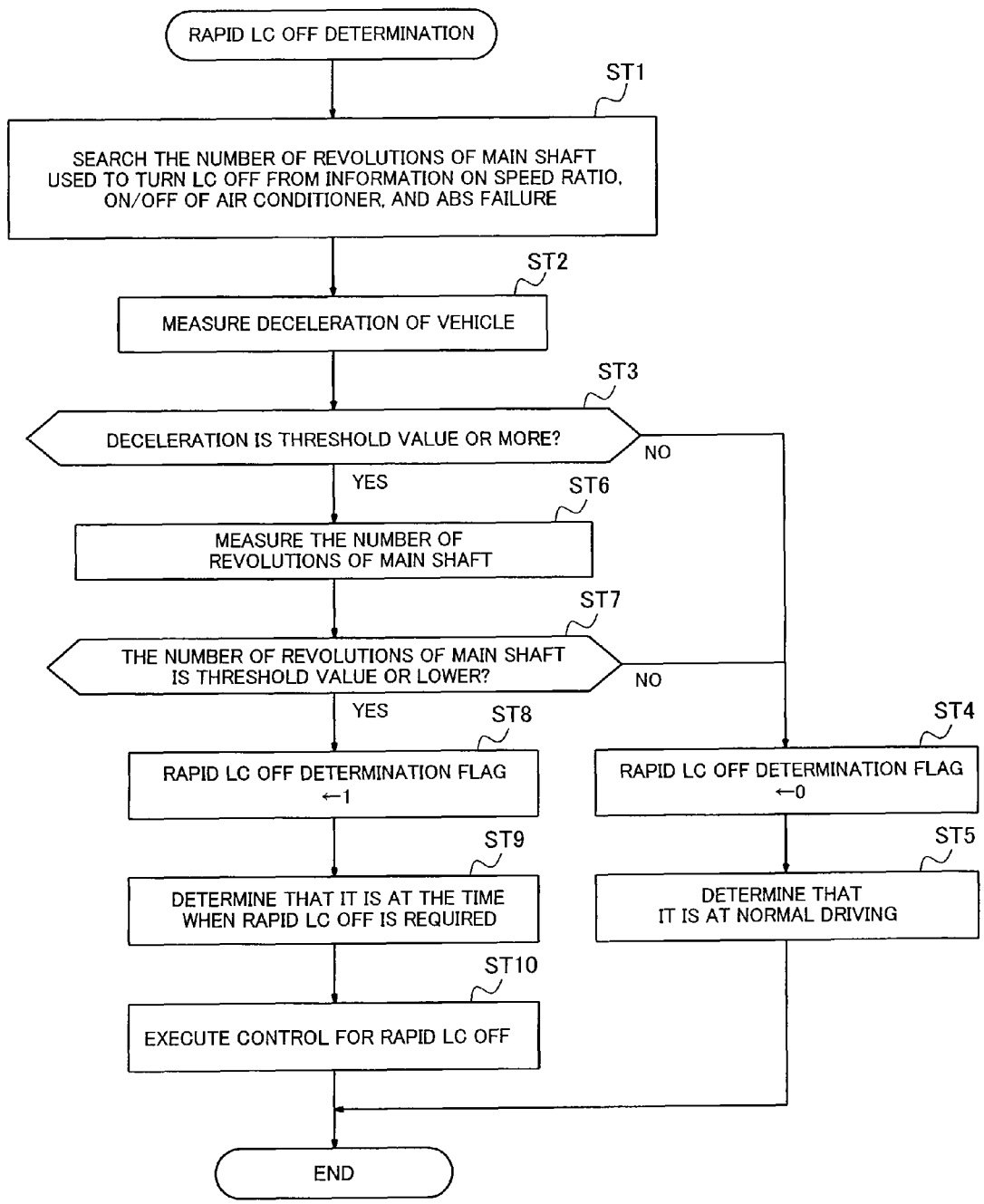
FIG. 5 is a flowchart for explaining determination procedures at the time when rapid lock-up off is required.
Figure 6:
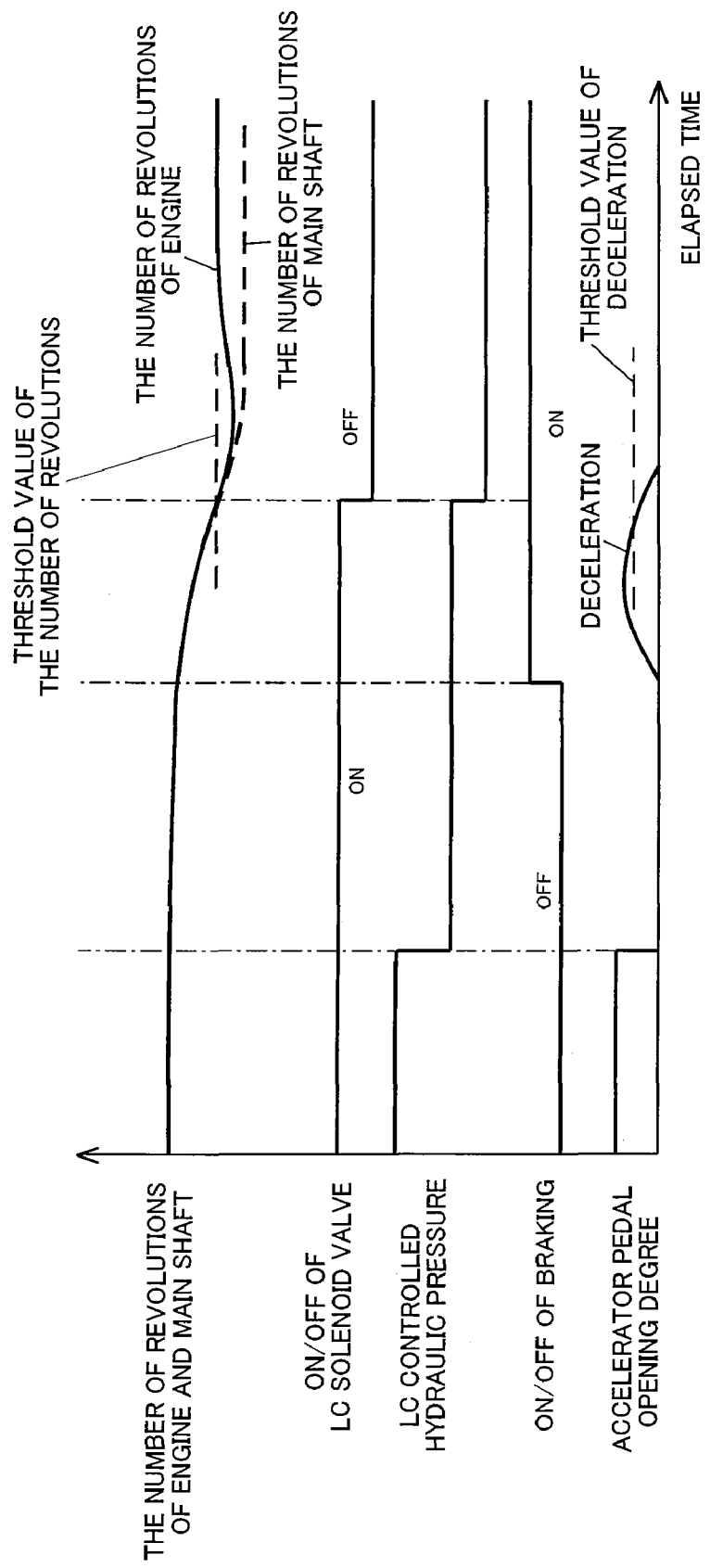
FIG. 6 is a schematic timing chart respectively showing changes over time of: the number of revolutions of an engine and the number of revolutions of a main shaft when rapid lock-up off is required; ON/OFF of a first solenoid valve; LC controlled hydraulic pressure; ON/OFF of a brake; an accelerator pedal opening degree; and deceleration of a vehicle.

Here, a method of determining whether rapid lock-up off is required or not will be described. FIG. 5 is a flowchart for explaining procedures of this determination. Further, FIG. 6 is a schematic timing chart respectively showing changes over time of: the number of revolutions of the engine and the number of revolutions of a main shaft in the case where rapid lock-up off is operated; ON/OFF of the first solenoid valve 32; a change in lock-up clutch controlled hydraulic pressure; ON/OFF of a brake; an accelerator pedal opening degree; and deceleration of the vehicle. Further, FIG. 7 is tables showing a correspondence of a speed ratio of the transmission set up during driving of the vehicle to the number of revolutions of the main shaft used to turn the lock-up clutch L OFF. In this regard, an operation at sudden braking of the vehicle will be described here as one example at the time when rapid lock-up off is required.

In determination of whether rapid lock-up off is required or not in conjunction with sudden braking of the vehicle, the ECU 35 first searches and determines the number of revolutions of the main shaft used to turn the lock-up clutch L OFF on the basis of information on a speed ratio set up during driving, ON/OFF of an air conditioner, and presence or absence of ABS failure from the tables between the speed ratio and the number of revolutions of the main shaft shown in FIG. 7 (Step ST1). In this regard, as shown in FIG. 7, a table at air conditioner OFF and ABS normal (no ABS failure) and a table at ABS failure are prepared, and the ECU 35 switches data on the number of revolutions of the main shaft used to turn the lock-up clutch L OFF in accordance with conditions. When the number of revolutions of the main shaft used to turn the lock-up clutch L OFF is determined, the ECU 35 subsequently measures deceleration of the vehicle (Step ST2). As a result, in the case where the deceleration is less than a predetermined threshold value ("NO" at Step ST3), the ECU 35 sets a rapid lock-up off determination flag to 0 (rapid lock-up off determination flag=0) (Step ST4). In the case where the rapid lock-up off determination flag is set to 0, the ECU 35 determines that it is at normal driving (Step ST5), whereby the first oil discharge passage 37 is selected as a discharge route of the hydraulic oil from the oil chamber 30. On the other hand, in the case where the deceleration is the predetermined threshold value or more ("YES" at Step ST3), the ECU 35 subsequently measures the number of revolutions of the main shaft (Step ST6). As a result, in the case where it is determined that the number of revolutions of the main shaft is the number of revolutions searched at Step ST1 or lower ("YES" at Step ST7), the ECU 35 sets the rapid lock-up off determination flag to 1 (Step ST8). In the case where the rapid lock-up off determination flag is set to 1, the ECU 35 determines that it is at the time when rapid lock-up off is required (Step ST9), and executes control for rapid lock-up off (Step ST10). Namely, the second oil discharge passage 39 is selected as the discharge route of the hydraulic oil from the oil chamber 30. On the other hand, in the case where it is determined that the number of revolutions of the main shaft is higher than the number of revolutions searched at Step ST1 ("NO" at Step ST7), the ECU 35 sets the rapid lock-up off determination flag to 0 (Step ST4).

In this regard, the sudden braking of the vehicle described here is one example of the time when rapid lock-up off is required. It is possible to determine that rapid lock-up off is required as needed even in cases other than this. For example, the hydraulic control device 1 can be configured so as to determine that rapid lock-up off is required when a D-N-R switching operation (quick shift) is carried out by means of speed-ratio operations of the transmission.

As explained above, in the hydraulic control device 1 according to the present embodiment, as a derivation route of the hydraulic oil from the oil chamber 30, the second oil discharge passage 39 whose oil passage length is shorter than that of the first oil discharge passage 37 and the opening 39a of the discharge end of which is placed at the position lower than that of the first oil discharge passage 37 is provided in addition to the first oil discharge passage 37. Thus, when it is determined that the driving state of the vehicle is one required for rapid lock-up off, the hydraulic oil discharged from the oil chamber 30 of the lock-up clutch L can be derived to the second oil discharge passage 39. Therefore, it is possible to shorten the discharge route of the hydraulic oil, and this makes it possible to discharge the hydraulic oil of the oil chamber 30 rapidly. Namely, in the case where it is determined that rapid lock-up off is required when deceleration of the vehicle becomes a predetermined value or more, such as at sudden braking, or at the time when a D-N-R switching operation is carried out, the lock-up clutch L is allowed to become the non-engagement state quickly by discharging the hydraulic oil of the oil chamber 30 at a back pressure side of the hydraulic piston 25 immediately. Therefore, it is possible to prevent an engagement state between the engine and the transmission from continuing at a stopped state of the vehicle effectively, and this makes it possible to avoid occurrence of defects such as engine stall.

Further, in the hydraulic control device 1 according to the present embodiment, by providing the second shift valve 33 for switching the derivation route of the hydraulic oil between the first oil discharge passage 37 and the second oil discharge passage 39, the derivation route can be switched between the first oil discharge passage 37 and the second oil discharge passage 39 on the basis of a determination result of the driving state of the vehicle. Therefore, it is possible to ensure a hydraulic pressure response at the time when the lock-up clutch L is caused to engage at normal driving by selecting the first oil discharge passage 37. In addition, it is possible to set the lock-up clutch L to the non-engagement state rapidly at the time when rapid lock-up off is required by selecting the second oil discharge passage 39. This makes it possible to improve both the hydraulic pressure response of the lock-up clutch L and engagement release.

Further, in this hydraulic control device 1, the drain port 37d is provided at the discharge end of the first oil discharge passage 37, the drain port 37d is placed at the position higher than the upper end of the outer diameter of the hydraulic piston 25, and the opening 39a of the discharge end in the second oil discharge passage 39 is opened at the position lower than the central axis C of the torque converter T. Thus, when engagement of the lock-up clutch L is released at normal driving, the hydraulic control device 1 becomes a state where the oil chamber 30 is filled with the hydraulic oil through the first oil discharge passage 37 by means of the drain port 37d arranged at the position higher than the upper end of the outer diameter of the hydraulic piston 25. Therefore, when the lock-up clutch L is caused to engage next time, hydraulic pressure can be transmitted to the hydraulic piston 25 immediately, and this makes it possible to improve response speed of engagement of the lock-up clutch L. On the other hand, the second oil discharge passage 39 whose discharge end is opened at the position lower than the central axis C of the torque converter T allows the hydraulic oil of the oil chamber 30 in the lock-up clutch L to be discharged rapidly at the time when rapid lock-up off is required. This makes it possible to set the lock-up clutch L to the non-engagement state quickly.

Second Embodiment

Figure 8:
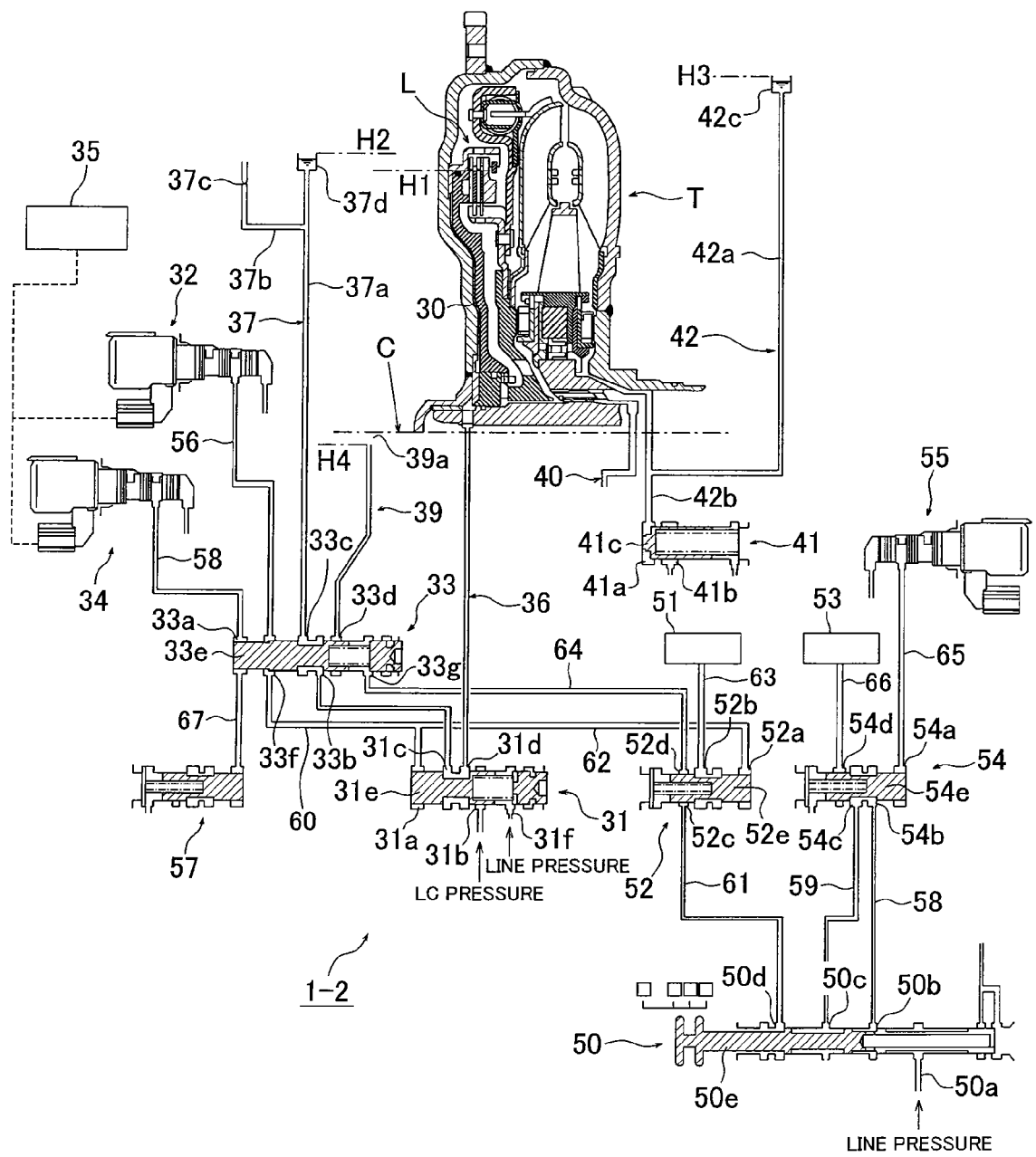
FIG. 8 is a schematic hydraulic circuit diagram showing a configuration of a hydraulic control device for a torque converter according to a second embodiment of the present invention.

Next, a hydraulic control device according to a second embodiment of the present invention will be described. In this regard, in explanation for a second embodiment and corresponding drawings, the same reference numerals are assigned to components (constituent parts) similar to or corresponding to those in the first embodiment, and detailed explanation for the components is omitted below. Further, matter other than the matter that will be described below and matter shown in the drawings are similar to those in the first embodiment. FIG. 8 is a schematic hydraulic circuit diagram showing a configuration of a hydraulic control device 1-2 according to the second embodiment.

In the hydraulic control device 1-2 according to the present embodiment, as controlled hydraulic pressure (signal pressure) for controlling a second shift valve 33, signal pressure from a first solenoid valve 32 is used in addition to signal pressure from a second solenoid valve 34. Moreover, as the controlled hydraulic pressure (signal pressure) for controlling the second shift valve 33, reverse clutch pressure for causing a reverse clutch 51 included in a transmission to engage is also used. Namely, in this hydraulic control device 1-2, by supplying part of line pressure (reverse clutch pressure) supplied to the reverse clutch 51 from a manual valve 50, which operates in accordance with an operation of a select lever, to the second shift valve 33, the second shift valve 33 is controlled. In this connection, as shown in FIG. 8, a shift valve (hereinafter, referred to as a "third shift valve") 52, a shift valve (hereinafter, referred to as a "fourth shift valve") 54, and a solenoid valve (hereinafter, referred to as a "third solenoid valve") 55 are provided in this hydraulic control device 1-2. The second shift valve 52 is used to control switching of supply of hydraulic oil to the manual valve 50 and the reverse clutch 51. The fourth shift valve 54 is used to control switching of line pressure from the manual valve 50 and hydraulic pressure from a linear solenoid valve 53. The third solenoid valve 55 is used to supply signal pressure to the fourth shift valve 54.

A fifth port 33f is provided between a first port 33a and a third port 33c of the second shift valve 33. Both an oil passage 56 connected to the first solenoid valve 32 and an oil passage 60 connected to a first port 31a of a first shift valve 31 are connected to the fifth port 33f. Therefore, signal pressure supplied to the first shift valve 31 from the first solenoid valve 32 is also supplied to the second shift valve 33 via the fifth port 33f. Further, in the present embodiment, signal pressure from the first solenoid valve 32 is also supplied to the third shift valve 52 for controlling supply of hydraulic oil to the reverse clutch 51 through an oil passage 62 connected to the oil passage 60.

A sixth port 33g is further provided in the second shift valve 33. The sixth port 33g is connected to a fourth port 52d of the third shift valve 52 (will be described later), to which line pressure (reverse clutch pressure) from the manual valve 50 is supplied.

Further, the first port 33a of the second shift valve 33 connected to the second solenoid valve 34 via an oil passage 58, and is connected to a lubrication cut valve 57 via an oil passage 67. Thus, signal pressure supplied to the second shift valve 33 from the second solenoid valve 34 is also supplied as signal pressure for operating the lubrication cut valve 57. The lubrication cut valve 57 is a valve for controlling supply of hydraulic oil for lubrication, and operates by means of signal pressure from the second solenoid valve 34.

The manual valve 50 includes a first port 50a, a second port 50b, a third port 50c, a fourth port 50d, and a spool 50e. The manual valve 50 is configured to switch communication between the ports by causing the spool 50e to move in accordance with a shift position (P, R, N, D and the like) selected by operations of the select lever (not shown in the drawings). Line pressure regulated by a regulator valve (not shown in the drawings) is supplied to the first port 50a. Further, the second port 50b is connected to the fourth shift valve 54 via the oil passage 58, and the third port 50c is connected to the fourth shift valve 54 via an oil passage 59. Moreover, the fourth port 50d is connected to the third shift valve 52 via an oil passage 61. Therefore, line pressure of the first port 50a is supplied to the reverse clutch 51 through the fourth shift valve 54 and the third shift valve 52, and is used to control engagement of the reverse clutch 51. Further, in the present embodiment, this line pressure is also supplied to the second shift valve 33 from the third shift valve 52, and is used to control the second shift valve 33.

The third shift valve 52 is configured so as to include: a first port 52a; a second port 52b; a third port 52c; a fourth port 52d; and a spool 52e. The first port 52a is connected to the fifth port 33f of the second shift valve 33 and the first port 31a of the first shift valve 31 via the oil passage 62. The second port 52b is connected to the reverse clutch 51 via an oil passage 63. The third port 52c is connected to the fourth port 50d of the manual valve 50 via the oil passage 61. The fourth port 52d is connected to the sixth port 33g of the second shift valve 33 via an oil passage 64.

The spool 52e of the third shift valve 52 is biased to the right by means of a spring. Therefore, when the first solenoid valve 32 is turned ON, signal pressure to be supplied causes the spool 52e to move to the left against biasing force of the spring. Thus, the second port 52b is in communication with the fourth port 52d in correspondence with the third port 52c. On the other hand, when the first solenoid valve 32 is turned OFF, biasing force of the spring causes the spool 52e to move to the right. Thus, communication between the second port 52b and the third port 52c is cut off.

The fourth shift valve 54 is configured so as to include: a first port 54a; a second port 54b; a third port 54c; a fourth port 54d; and a spool 54e. The third solenoid valve 55 is connected to the first port 54a via an oil passage 65. The second and third ports 54b, 54c are connected to the second and third ports 50b, 50c of the manual valve 50, respectively. Line pressure for the reverse clutch 51 is supplied from the second port 50b of the manual valve 50. The linear solenoid valve 53 is connected to the fourth port 54d via an oil passage 66, and linear solenoid valve pressure for the reverse clutch 51 is supplied to the fourth port 54d.

The spool 54e of the fourth shift valve 54 is biased to the right by means of a spring. Therefore, when the third solenoid valve 55 is turned ON, signal pressure to be supplied causes the spool 54e to move to the left against biasing force of the spring. Thus, the third port 54c is in communication with the fourth port 54d, and communication between the second port 54b and the third port 54c is cut off. On the other hand, when the third solenoid valve 55 is turned OFF, biasing force of the spring causes the spool 54e to move to the right. Thus, the second port 54b is in communication with the third port 54c, and the fourth port 54d is cut off.

Figure 9A:
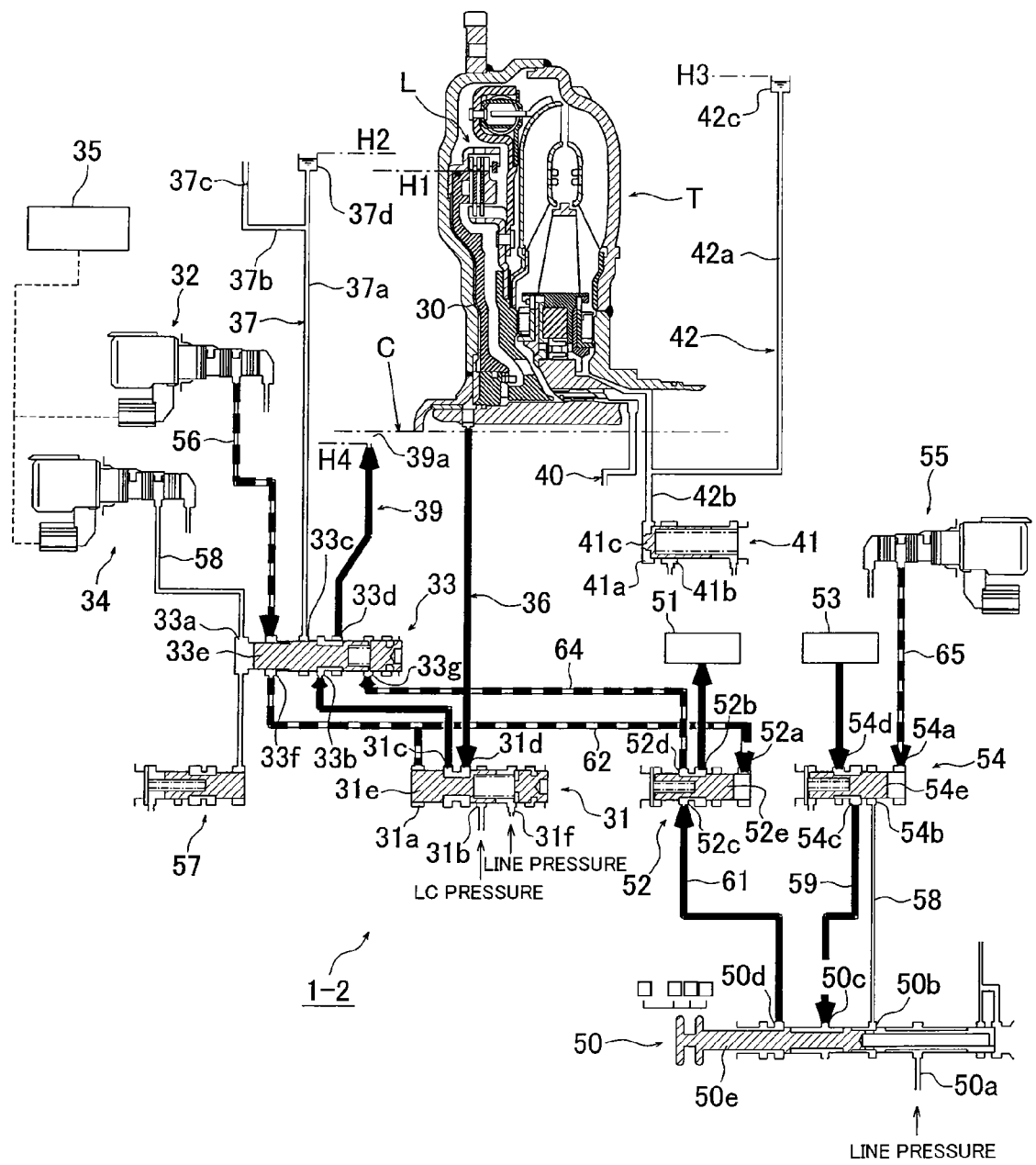
FIG. 9A is a drawing showing flow of hydraulic oil in the case where the lock-up clutch is caused not to engage at a D-N-R operation.
Figure 9B:
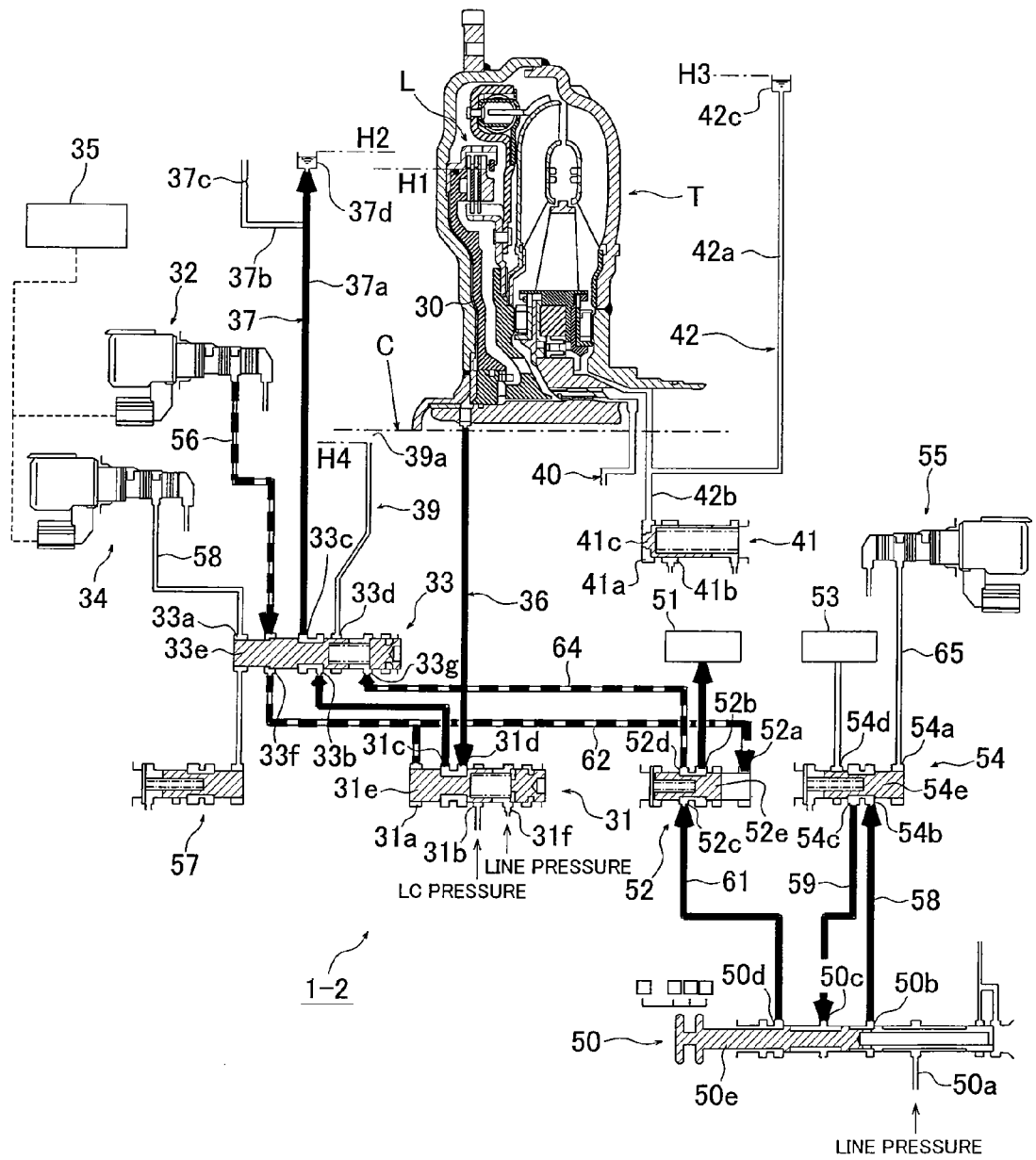
FIG. 9B is a drawing showing flow of hydraulic oil in the case where the lock-up clutch is caused not to engage at a reverse stationary state.
Figure 9C:
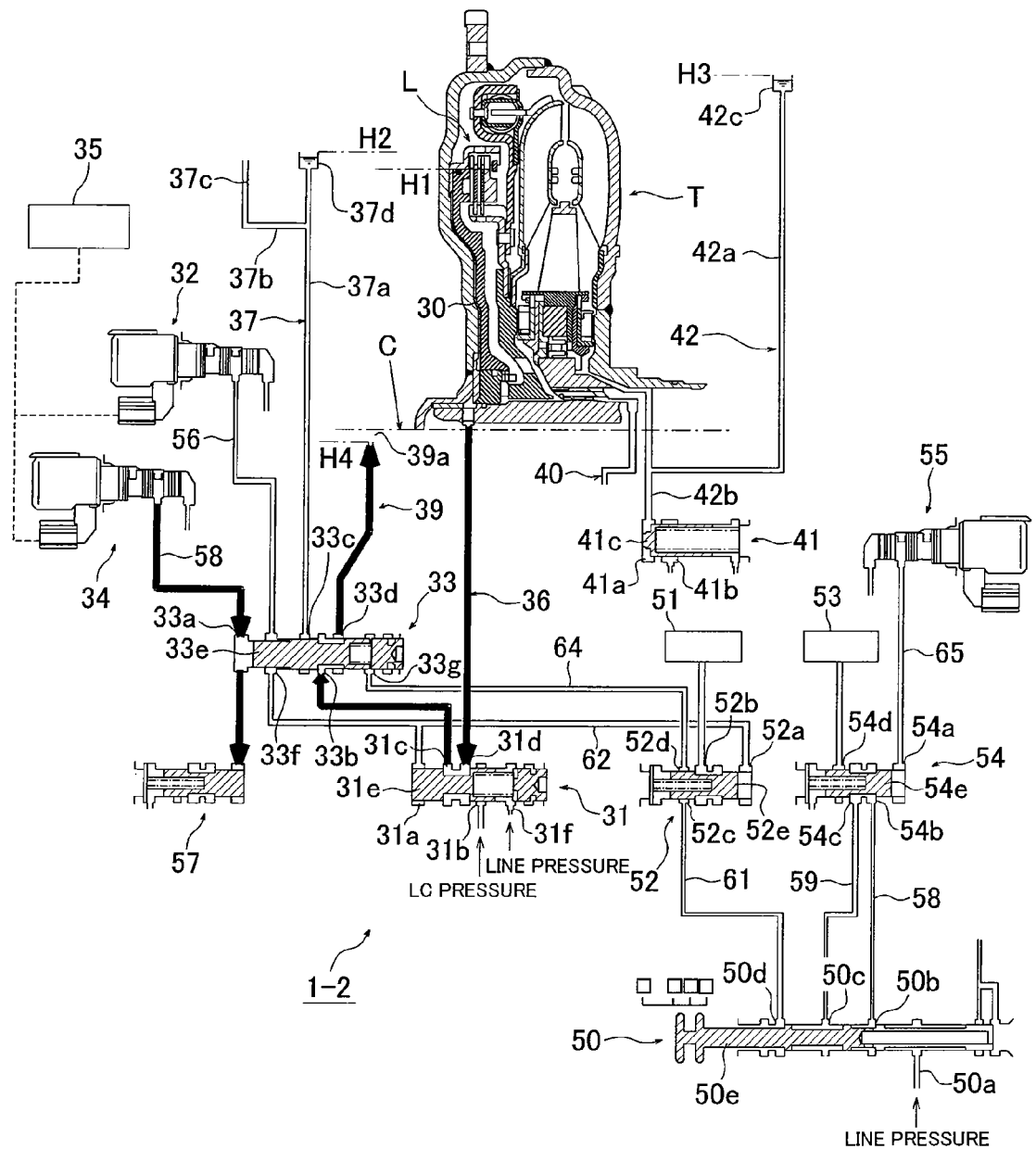
FIG. 9C is a drawing showing flow of hydraulic oil in the case where the lock-up clutch is caused not to engage at sudden braking of the vehicle.

Here, the case where the lock-up clutch L is caused not to engage (or to release) in the hydraulic control device 1-2 according to the present embodiment will be described. In this regard, flow at a D-N-R operation, which is one example of the time when rapid lock-up off is required (at a D-N-R quick shift operation: when a reverse speed ratio is set up by a quick D-N-R operation using the select lever, thereby shifting a traveling direction of the vehicle from forward to reverse); flow at a reverse stationary state, which is one example of normal driving (when predetermined time elapses since the reverse speed ratio is set up, and the hydraulic control device 1-2 becomes a static state); and flow at sudden braking of the vehicle, which is another example of the time when rapid lock-up off is required (at a so-called panic stop operation) will be explained as examples here. FIGS. 9A to 9C are drawings each showing flow of hydraulic oil in the case where the lock-up clutch L is caused not to engage. FIG. 9A shows flow at the D-N-R operation, FIG. 9B shows flow at the reverse stationary state, and FIG. 9C shows flow at sudden braking of the vehicle.

(1) Flow at a D-N-R Operation

As shown in FIG. 9A, the third solenoid valve 55 is turned ON at a D-N-R operation by means of the select lever. Thus, signal pressure supplied from the third solenoid valve 55 causes the spool 54e of the fourth shift valve 54 to move to the left. Therefore, since the fourth port 54d is in communication with the third port 54c, the linear solenoid valve pressure for the reverse clutch 51 supplied to the fourth port 54d is introduced to the third port 50c of the manual valve 50 via the third port 54c, and is further supplied to the third shift valve 52 through the fourth port 50d. In this case, the line pressure supplied from the manual valve 50 is cut off by the second port 54b of the fourth shift valve 54. The linear solenoid valve pressure supplied to the third shift valve 52 is supplied not only to the reverse clutch 51 from the second port 52b, but also to the second shift valve 33 from the fourth port 52d as signal pressure for controlling the second shift valve 33.

On the other hand, the first solenoid valve 32 is turned ON at the D-N-R operation. Thus, signal pressure is supplied to the second shift valve 33 from the first solenoid valve 32. Here, when the signal pressure supplied to the second shift valve 33 from the linear solenoid valve 53 is compared with the signal pressure from the first solenoid valve 32, the signal pressure from the linear solenoid valve 53 is lower than the signal pressure from the first solenoid valve 32. For that reason, the spool 33e of the second shift valve 33 is caused to move to the right against biasing force of the spring. Thus, the second port 33b is in communication with the fourth port 33d, and communication between the second port 33b and the third port 33c is cut off. Therefore, the hydraulic oil discharged from the oil chamber 30 and introduced into the second port 33b is derived to the second oil discharge passage 39. In this case, the signal pressure from the first solenoid valve 32 is also supplied to the first shift valve 31. However, since line pressure is supplied to the fifth port 31f in the first shift valve 31, the spool 33e is not caused to move to the right, and becomes a state so as to be positioned at the left end.

Therefore, at the D-N-R operation, the second oil discharge passage 39 is selected as a discharge route of the hydraulic oil from the oil chamber 30. Thus, it is possible to discharge the hydraulic oil of the oil chamber 30 rapidly, and this makes it possible to reduce hydraulic pressure. Therefore, the lock-up clutch L can be set to the non-engagement state quickly. Namely, by using reverse operating pressure for setting up a reverse speed ratio (signal pressure to the third shift valve 52) as the signal pressure of the second shift valve 33, it is possible to select the second oil discharge passage 39 as the discharge route from the oil chamber 30 when a traveling direction of the vehicle is shifted from forward to reverse rapidly in an engagement state of the lock-up clutch L by D-N-R quick shift. Thus, since engagement of the lock-up clutch L can be released before the vehicle becomes a temporarily stopped state when to shift from forward to reverse, it is possible to prevent defects such as engine stall from occurring effectively.

Further, by sharing the signal pressure of the second shift valve 33 with the reverse operating pressure that is signal pressure to the third shift valve 52 here, at the D-N-R operation, engagement of the lock-up clutch L can be released rapidly, and an operation of the reverse speed ratio can be ensured.

In this regard, the second solenoid valve 34 is turned OFF at the D-N-R operation. Thus, since the lubrication cut valve 57 is caused not to operate by not using the signal pressure of the second solenoid valve 34, lubrication for each part when to set up the reverse speed ratio can be ensured.

(2) Flow at a Reverse Stationary State

Next, flow at a reverse stationary state will be described. In this case, as shown in FIG. 9B, line pressure of the first port 50a of the manual valve 50 is supplied to the second port 54b of the fourth shift valve 54 from the second port 50b by selecting a reverse speed ratio by means of the select lever. Then, at the reverse stationary state, the third solenoid valve 55 is turned OFF. Thus, the spool 54e of the fourth shift valve 54 is caused to move to the right, whereby the line pressure supplied to the second port 54b of the fourth shift valve 54 is introduced into the third port 50c of the manual valve 50 via the third port 54c to be further supplied to the third shift valve 52 via the fourth port 50d. The line pressure supplied to the third shift valve 52 is supplied not only to the reverse clutch 51 from the second port 52b, but also to the second shift valve 33 from the fourth port 52d.

On the other hand, at the reverse stationary state, the first solenoid valve 32 is turned ON. Thus, signal pressure is supplied to the second shift valve 33 from the first solenoid valve 32. Here, the signal pressure supplied to the second shift valve 33 from the first solenoid valve 32 is equal to the line pressure from the manual valve 50. For that reason, biasing force of the spring causes the spool 33e of the second shift valve 33 to move to the left. Thus, in the second shift valve 33, the second port 33b is in communication with the third port 33c, and communication between the second port 33b and the fourth port 33d is cut off. Therefore, the hydraulic oil discharged from the oil chamber 30 of the lock-up clutch L and introduced into the second port 33b is derived to the first oil discharge passage 37.

Therefore, at the reverse stationary state, the first oil discharge passage 37 is selected as the discharge route of the hydraulic oil from the oil chamber 30. In particular, in the present embodiment, by applying the line pressure (reverse clutch pressure) supplied to the reverse clutch 51 against the reverse operating pressure applied to the second shift valve 33, the first oil discharge passage 37 is always selected after shifting to the reverse stationary state. Thus, even when the lock-up clutch L is caused not to engage, the oil chamber 30 is filled with the hydraulic oil introduced from the first oil discharge passage 37 to the outer diameter of the oil chamber 30. Therefore, when the lock-up clutch L is caused to engage at a next R-N-D operation, the time to fill the oil chamber 30 with the hydraulic oil is not required. For this reason, it is possible to shorten time (response time) required to cause the lock-up clutch L to engage, and improvement of a response of the lock-up clutch L can be expected.

In this regard, since the signal pressure of the second shift valve 33 is also shared with the reverse signal pressure at the reverse stationary state as well as the D-N-R operation, it is possible to ensure an operation of the reverse speed ratio. Further, the second solenoid valve 34 is turned OFF at the reverse stationary state. Thus, since the lubrication cut valve 57 is caused not to operate by not using the signal pressure of the second solenoid valve 34, lubrication for each part when to set up the reverse speed ratio can be ensured.

(3) Flow at Sudden Braking of the Vehicle

Next, flow at sudden braking of the vehicle will be described. At sudden braking of the vehicle, the second solenoid valve 34 is turned ON. Thus, as shown in FIG. 9C, signal pressure is supplied to the second shift valve 33 from the second solenoid valve 34, whereby by causing the spool 33e to move to the right in the second shift valve 33, the second port 33b is in communication with the fourth port 33d, and communication between the second port 33b and the third port 33c is cut off. Therefore, the hydraulic oil discharged from the oil chamber 30 and introduced into the second port 33b is derived to the second oil discharge passage 39. Therefore, since the second oil discharge passage 39 is selected as a discharge route of hydraulic oil from the oil chamber 30 at sudden braking of the vehicle, it is possible to discharge the hydraulic oil of the oil chamber 30 of the lock-up clutch L rapidly, and this makes it possible to reduce the hydraulic pressure. Therefore, the lock-up clutch L can be set to the non-engagement state quickly.

Further, at sudden braking of the vehicle, the signal pressure supplied to the second shift valve 33 from the second solenoid valve 34 is also supplied as signal pressure for operating the lubrication cut valve 57. Thus, the lubrication cut valve 57 is operated to discharge hydraulic oil for lubrication. Namely, in the present embodiment, by sharing the signal pressure of the second shift valve 33 with a lubrication cut signal to cut off supply of the hydraulic oil for lubrication, at sudden braking of the vehicle, the second oil discharge passage 39 can be selected as the discharge route of the hydraulic oil from the oil chamber 30, and the supply of the hydraulic oil for lubrication can also be cut off. For this reason, it is possible to eliminate an influence of drag of the lock-up clutch L due to centrifugal hydraulic pressure by the hydraulic oil for lubrication effectively.

Third Embodiment

Figure 10:
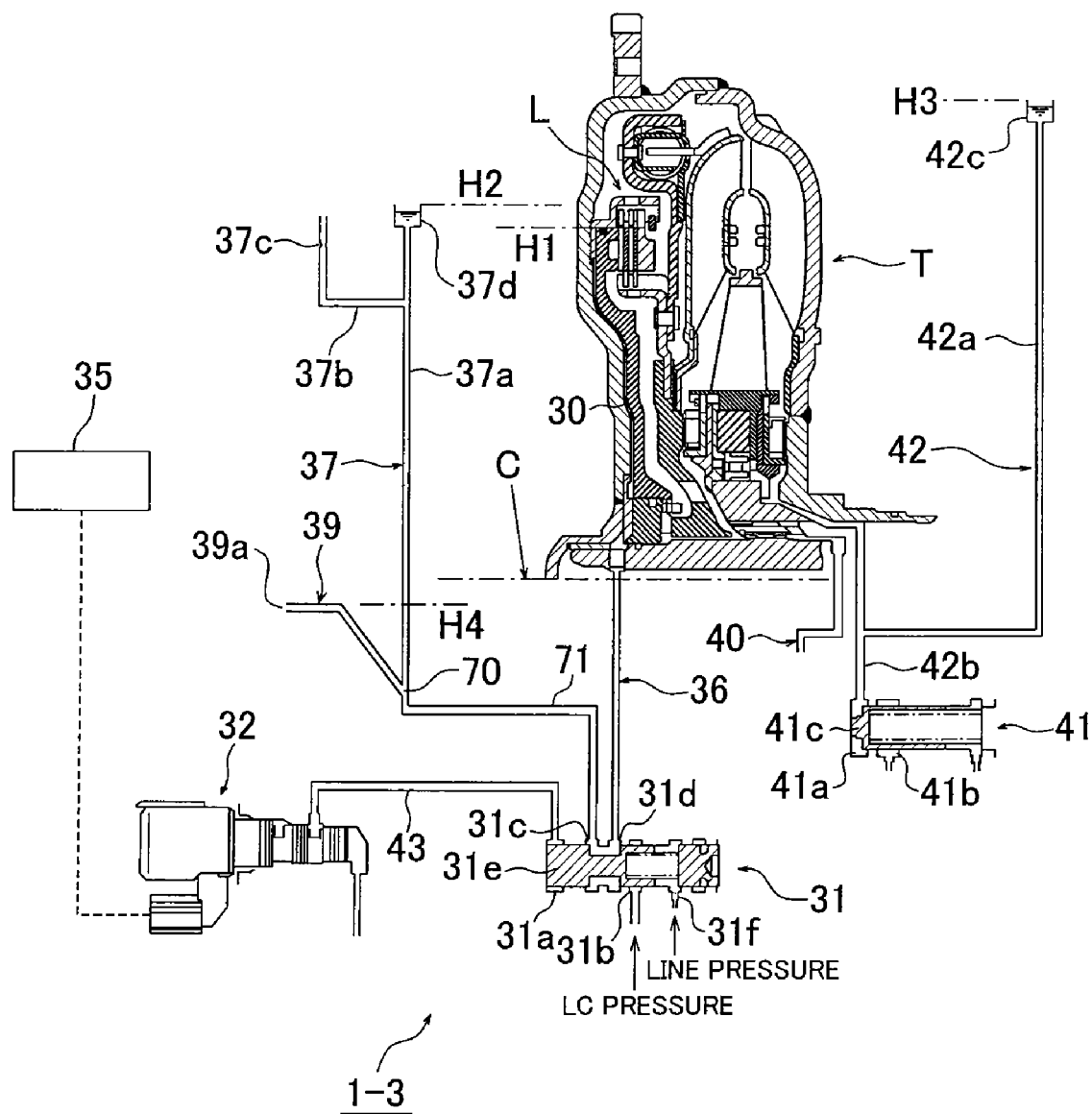
FIG. 10 is a schematic hydraulic circuit diagram showing a configuration of a hydraulic control device according to a third embodiment of the present invention.

Next, a hydraulic control device for a torque converter according to a third embodiment of the present invention will be described. FIG. 10 is a schematic hydraulic circuit diagram showing a configuration of a hydraulic control device 1-3 according to the third embodiment. In the hydraulic control device 1 according to the first embodiment, the second shift valve (lock-up clutch discharge valve) 33 for switching the discharge route of the hydraulic oil discharged from the oil chamber 30 between the first oil discharge passage 37 and the second oil discharge passage 39 has been provided. However, in the hydraulic control device 1-3 according to the present embodiment, this second shift valve 33 is omitted. Namely, the hydraulic control device 1-3 is configured so that a branch portion 70 for forking into two branches is provided on an oil passage 71 connected to a third port 31c of a first shift valve 31 and the branch portion 70 causes a discharge side thereof to fork into a first oil discharge passage 37 and a second oil discharge passage 39. The first oil discharge passage 37 extends just upward from the branch portion 70 in a linear manner, while the second oil discharge passage 39 is connected to the first oil discharge passage 37 at a state where the second oil discharge passage 39 makes an acute angle with a line extending from a drain port 37d side to the lock-up clutch L at the branch portion (connecting portion) 70 (that is, a state where the discharge side extends obliquely upward from the branch portion 70).

Further, in the present embodiment, the second oil discharge passage 39 is also placed at a position at which an opening 39a of a discharge end thereof is lower than the central axis C of a torque converter T. Namely, the second oil discharge passage 39 is adapted to discharge the hydraulic oil to a position lower than the central axis C and in the air. Further, an oil passage length of the second oil discharge passage 39 is shorter than that of the first oil discharge passage 37.

In the present embodiment, by connecting the second oil discharge passage 39 to first oil discharge passage 37 with the acute angle (less than 90°), the hydraulic oil introduced from a branch oil passage 37b in the first oil discharge passage 37 flows in the oil chamber 30 through the second shift valve 33 and an oil supply/discharge passage 36 without entering the second oil discharge passage 39, whereby the oil chamber 30 is filled with the hydraulic oil to a height position of an upper end of an outer diameter of a hydraulic piston 25. On the other hand, when viewed from the oil chamber 30 side of the lock-up clutch L, the second oil discharge passage 39 is branched so as to make an obtuse angle (90° or more) with the first oil discharge passage 37, the oil passage length of the second oil discharge passage 39 is shorter than that of the first oil discharge passage 37, and its discharge end is opened at a position lower than that of the first oil discharge passage 37. For this reason, in the case where it is required to set the lock-up clutch L to a non-engagement state quickly, it can be expected that the hydraulic oil discharged from the oil chamber 30 of the lock-up clutch L flows in the second oil discharge passage 39 by priority with respect to the first oil discharge passage 37 at the branch portion 70.

The hydraulic control device 1-3 according to the present embodiment has a simple configuration in which the second shift valve 33 for selecting any one of the first oil discharge passage 37 and the second oil discharge passage 39 is omitted and the branch portion 70 for causing the oil discharge passage to be branched is provided. By appropriately designing a branch (connection) angle of the second oil discharge passage 39 against the first oil discharge passage 37 at the branch portion 70, a ratio of a diameter between the second oil discharge passage 39 and the first oil discharge passage 37, and other conditions, the hydraulic control device 1-3 can be configured so that the second oil discharge passage 39 is selected as the discharge route of the hydraulic oil of the oil chamber 30 by priority when the lock-up clutch L is to be set to the non-engagement state quickly. Therefore, the hydraulic pressure response when to cause the lock-up clutch L to engage at normal driving can be ensured. In addition, at the time when rapid lock-up off is required, the lock-up clutch L can be set to the non-engagement state rapidly. For that reason, it is possible to improve both the hydraulic pressure response of the lock-up clutch L and a non-engagement response.

Although the embodiments of the present invention have been explained above, the present invention is not limited to the above embodiments. Various modifications can be made in a scope of the technical idea described in the following claims, the specification described above and the accompanying drawings without departing from the spirit and scope of the present invention. In this regard, even any shape, structure or material that is not described directly in the specification and the drawings falls within the technical idea of the present invention so long as the function and the effect of the present invention are achieved.

What is claimed is:

1. A hydraulic control device for controlling hydraulic pressure of a torque converter with a lock-up clutch, the lock-up clutch being constructed from a hydraulic piston and a clutch member, the hydraulic piston being installed in an inner space of the torque converter so that an oil chamber is formed between the hydraulic piston and a cover of the torque converter, the clutch member causing the cover and a turbine runner of the torque converter to engage and be released due to movement of the hydraulic piston by supply and discharge of hydraulic oil to and from the oil chamber, the hydraulic control device comprising:

a first shift valve for carrying out engagement control of the lock-up clutch by switching supply and discharge of the hydraulic oil to and from the oil chamber;

a first oil discharge passage and a second oil discharge passage for deriving the hydraulic oil discharged from the oil chamber via the first shift valve;

a second shift valve for switching the first oil discharge passage and the second oil discharge passage;

first and second solenoid valves for respectively supplying controlled hydraulic pressure for controlling switching of the first and second shift valves to the first and second shift valves; and a control section for determining a driving state of a vehicle and controlling the first and second solenoid valves on the basis of the determined driving state, wherein an oil passage length of the second oil discharge passage is shorter than that of the first oil discharge passage and a discharge end of the second oil discharge passage is opened at a lower position than that of the first oil discharge passage, wherein the control section derives the hydraulic oil, discharged from the oil chamber via the first shift valve, to the first oil discharge passage by means of the second shift valve when it is determined that the driving state of the vehicle is one during normal driving, and wherein the control section derives the hydraulic oil to the second oil discharge passage by means of the second shift valve when it is determined that the driving state of the vehicle is one required for rapid lock-up off.

2. The hydraulic control device as claimed in claim 1, wherein a drain port is provided at the discharge end of the first oil discharge passage, the drain port is placed at a position higher than an upper end of an outer diameter of the hydraulic piston, and the discharge end of the second oil discharge passage is placed at a position lower than a central axis of the torque converter.

3. The hydraulic control device as claimed in claim 1, wherein the control section determines that the driving state is one required for the rapid lock-up off in the case of sudden braking in which deceleration of the vehicle becomes a predetermined degree or more.

4. The hydraulic control device as claimed in claim 1, wherein a transmission is mounted on the vehicle, and wherein the control section determines that the driving state is one required for the rapid lock-up off in the case where a D-N-R switching operation is carried out in switching operations of speed ratios in the transmission.

5. The hydraulic control device as claimed in claim 1, wherein the controlled hydraulic pressure supplied to the first shift valve from the first solenoid valve is also supplied to the second shift valve to be used to control switching of ON/OFF of the second shift valve.

6. The hydraulic control device as claimed in claim 5, wherein a transmission is mounted on the vehicle, and wherein the controlled hydraulic pressure supplied from the first solenoid valve is further supplied to a third shift valve for switching hydraulic pressure to cause a reverse clutch provided in the transmission to engage, and is used as the controlled hydraulic pressure of the third shift valve.

7. The hydraulic control device as claimed in claim 6, wherein the hydraulic pressure for causing the reverse clutch to engage is supplied to the second shift valve as controlled hydraulic pressure that resists the controlled hydraulic pressure of the first solenoid valve.

8. The hydraulic control device as claimed in claim 1, wherein the controlled hydraulic pressure supplied from the second solenoid valve to the second shift valve is supplied to a lubrication cut valve for cutting off supply of hydraulic oil for lubrication, and is used as controlled hydraulic pressure of the lubrication cut valve.

* * * * *